(12) United States Patent
Manninen

(10) Patent No.: US 9,587,351 B2
(45) Date of Patent: Mar. 7, 2017

(54) NON-WOVEN DOUBLE-LAYER INDUSTRIAL TEXTILE ASSEMBLED FROM SLEEVE CONFIGURATION PANELS, AND PANELS THEREFOR

(71) Applicant: AstenJohnson, Inc., Charleston, SC (US)

(72) Inventor: Allan R. Manninen, Ontario (CA)

(73) Assignee: ASTENJOHNSON, INC., Charleston, SC (US)

( * ) Notice: Subject to any disclaimer, the term of this patent is extended or adjusted under 35 U.S.C. 154(b) by 0 days.

(21) Appl. No.: 15/101,729

(22) PCT Filed: Dec. 5, 2014

(86) PCT No.: PCT/CA2014/000864
§ 371 (c)(1),
(2) Date: Jun. 3, 2016

(87) PCT Pub. No.: WO2015/081417
PCT Pub. Date: Jun. 11, 2015

(65) Prior Publication Data
US 2016/0312406 A1    Oct. 27, 2016

(30) Foreign Application Priority Data

Dec. 6, 2013  (CA) ...................... 2835951

(51) Int. Cl.
*D21F 1/00* (2006.01)
*B32B 3/26* (2006.01)
(Continued)

(52) U.S. Cl.
CPC .............. *D21F 1/0036* (2013.01); *B32B 3/26* (2013.01); *D04H 13/00* (2013.01); *D21F 1/0054* (2013.01);
(Continued)

(58) Field of Classification Search
CPC ........ D21F 1/00; D21F 1/0027; D21F 1/0036; D21F 1/0054; D21F 1/0063; D21F 1/10;
(Continued)

(56) References Cited

U.S. PATENT DOCUMENTS 3,162,567 A * 12/1964 Heller .................. D21F 1/0063
428/597
3,324,991 A *  6/1967 Voss .......................... F16G 3/02
198/844.2
(Continued)

FOREIGN PATENT DOCUMENTS

CA          2688168 A1 *  6/2011  ........... D21F 1/0054
CA          2688470 A1     6/2011
(Continued)

OTHER PUBLICATIONS

Machine translation (J-PlatPat) of JP 2000-044026 A. Translated Sep. 9, 2016.*
(Continued)

*Primary Examiner* — Maria Veronica Ewald
*Assistant Examiner* — Ethan A Utt
(74) *Attorney, Agent, or Firm* — Christopher & Weisberg, P.A.

(57) ABSTRACT

Non-woven double layer industrial textiles comprising a plurality of interconnected selectively slit and profiled panels formed from suitable sheet or film materials. Each panel includes two fold regions at each end. Each fold region has an array of slots and strips which form hem loops and hem loop-receiving openings by folding each region beneath and toward the panel body. The panel further includes two seam regions at a central portion of the panel, which when folded, provide seam loops and seam loop receiving openings. Outside free edges of the end fold regions are returned and sealed interior to the double layer so as to avoid fraying of (Continued)

free ends. Each seam region of the folded panel is interconnectable with the corresponding seam region of adjacent similar folded panels by means of a seam connecting member. Additional panels composed of heat- or wear-resistant material can be connected to lateral outside edges of panels forming the textile.

18 Claims, 22 Drawing Sheets

(51) Int. Cl.
F16G 3/04 (2006.01)
D21F 7/10 (2006.01)
D21F 7/08 (2006.01)
D04H 13/00 (2006.01)

(52) U.S. Cl.
CPC .............. *D21F 1/0063* (2013.01); *D21F 7/08* (2013.01); *D21F 7/10* (2013.01); *F16G 3/04* (2013.01)

(58) Field of Classification Search
CPC . D21F 7/08; D21F 7/083; D21F 7/086; D21F 7/10; D21F 7/12; F16G 3/02; F16G 3/04; B32B 3/24; B32B 3/26; B32B 3/266; B65G 15/30–15/58; D04H 13/00; D04H 13/001–13/008; Y10T 428/24273–428/24347
USPC .................................. 428/131–140
See application file for complete search history.

(56) References Cited

U.S. PATENT DOCUMENTS

| | | | | |
|---|---|---|---|---|
| 3,530,898 A | * | 9/1970 | Wilson | F16L 59/021 138/167 |
| 9,303,356 B2 | * | 4/2016 | Manninen | D21F 1/0036 |
| 9,334,606 B2 | * | 5/2016 | Manninen | D21F 1/0054 |
| 9,358,752 B2 | * | 6/2016 | Manninen | B32B 3/266 |
| 2008/0295306 A1 | * | 12/2008 | Despault | D21F 1/0054 28/142 |
| 2012/0244311 A1 | * | 9/2012 | Manninen | B32B 3/266 428/133 |
| 2014/0199510 A1 | * | 7/2014 | Manninen | D21F 1/0054 428/136 |
| 2014/0308476 A1 | * | 10/2014 | Manninen | D21F 1/0054 428/138 |
| 2015/0132524 A1 | * | 5/2015 | Manninen | B32B 3/266 428/43 |
| 2015/0167215 A1 | * | 6/2015 | Manninen | D04H 13/00 428/132 |
| 2015/0247280 A1 | * | 9/2015 | Manninen | D21F 1/0054 428/122 |
| 2015/0267348 A1 | * | 9/2015 | Manninen | D21F 1/0036 428/137 |
| 2016/0039171 A1 | * | 2/2016 | Manninen | D21F 1/0072 428/137 |

FOREIGN PATENT DOCUMENTS

| | | | | |
|---|---|---|---|---|
| CA | 2738918 A1 | | 6/2011 | |
| CA | 2749477 A1 | | 2/2013 | |
| JP | 2000044026 A | * | 2/2000 | |
| WO | 2009/032271 A2 | | 3/2009 | |
| WO | WO 2013023272 A1 | * | 2/2013 | ............ D21F 1/0054 |
| WO | WO 2013071419 A1 | * | 5/2013 | ............ D21F 1/0054 |
| WO | WO 2013181748 A1 | * | 12/2013 | ............ D04H 13/00 |
| WO | WO 2013188964 A1 | * | 12/2013 | ............ B32B 3/266 |
| WO | WO 2014053055 A1 | * | 4/2014 | ............ D21F 1/0036 |
| WO | WO 2014075170 A1 | * | 5/2014 | ............ D21F 1/0054 |
| WO | WO 2014153644 A1 | * | 10/2014 | ............ D21F 1/0072 |

OTHER PUBLICATIONS

International Search Report and Written Opinion dated Feb. 24, 2015 for International Application Serial No. PCT/CA2014/000864, International Filing Date: Dec. 5, 2014, consisting of 9 pages.

* cited by examiner

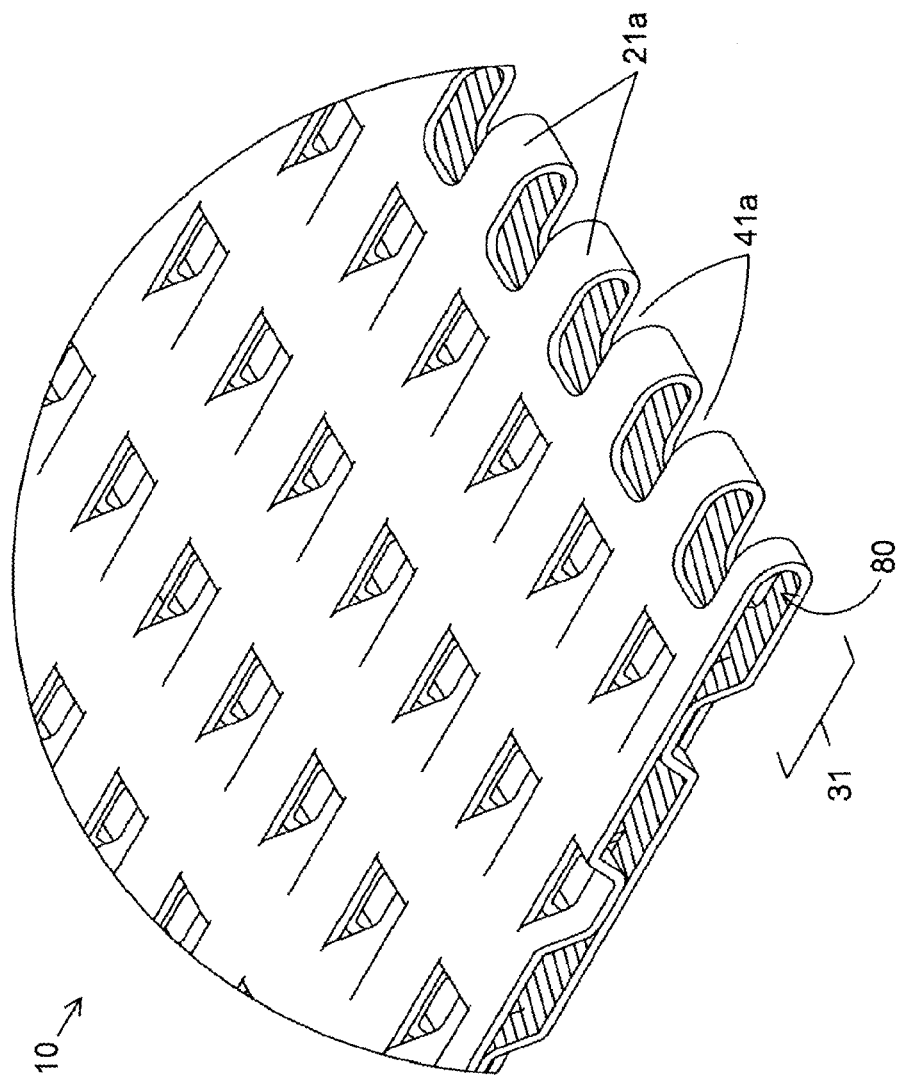

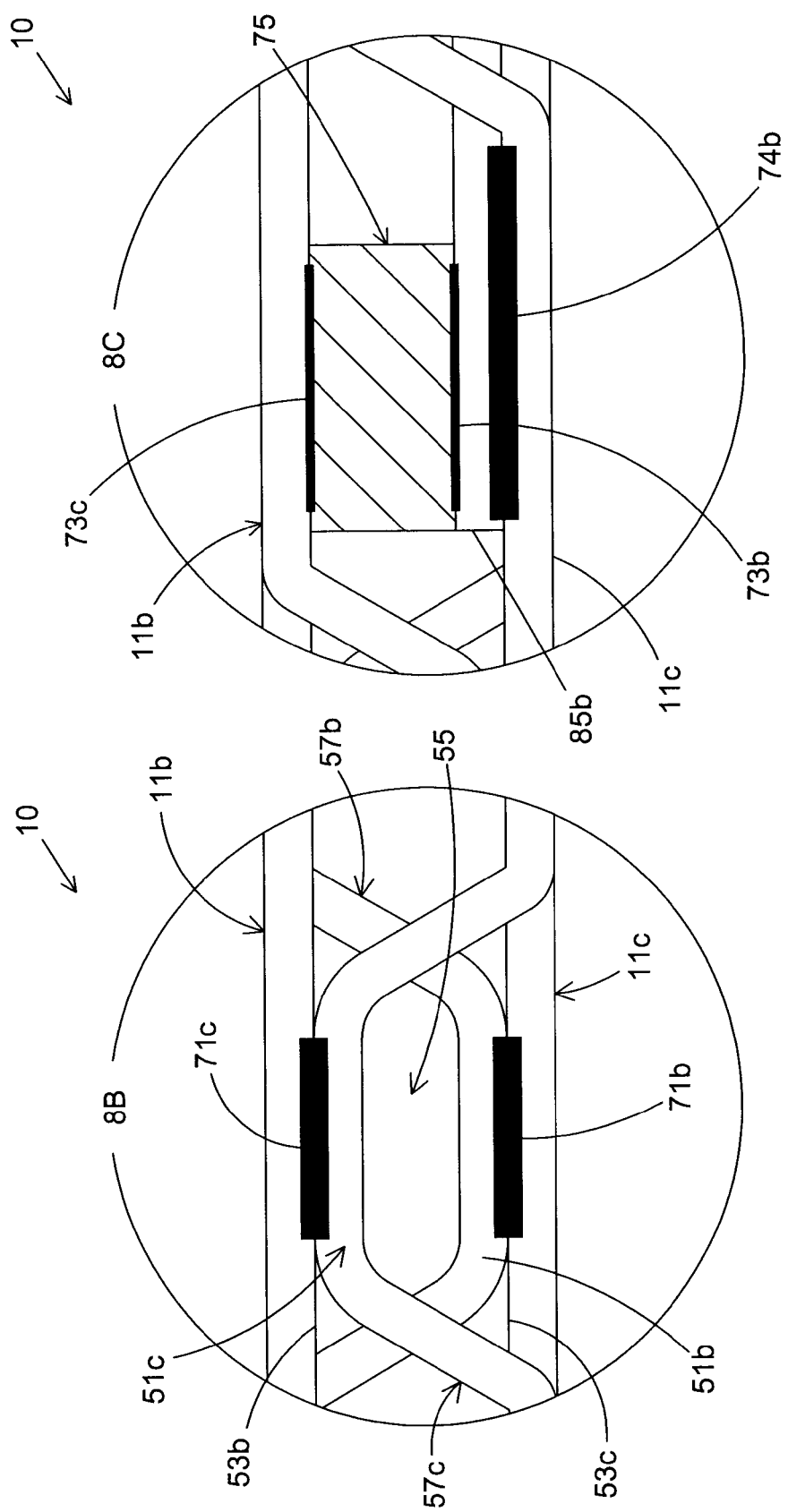

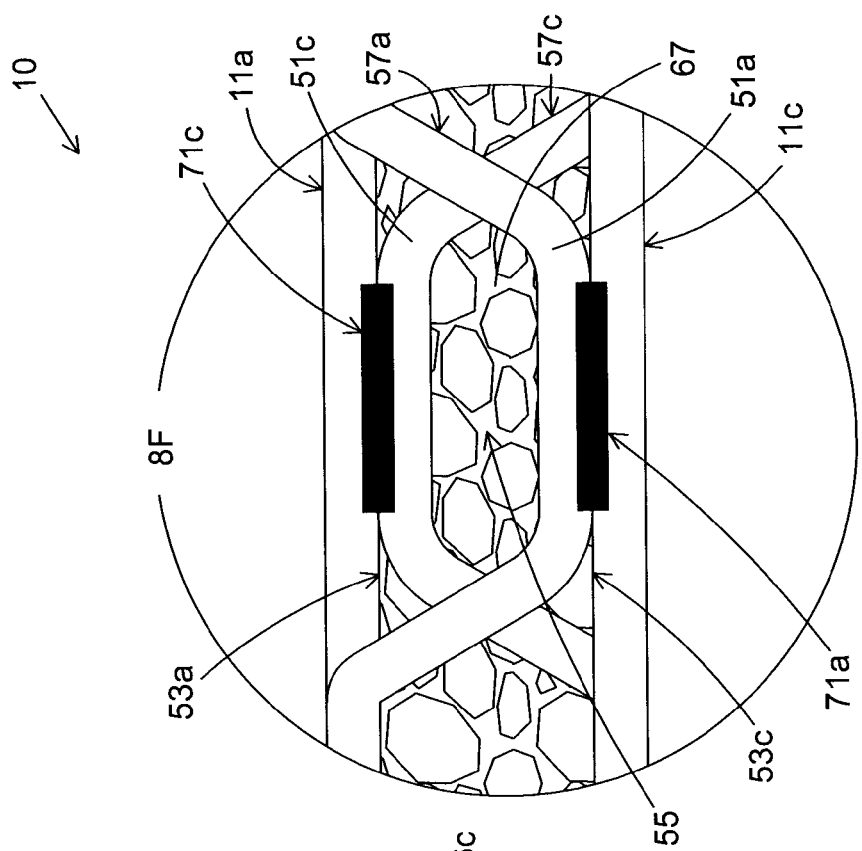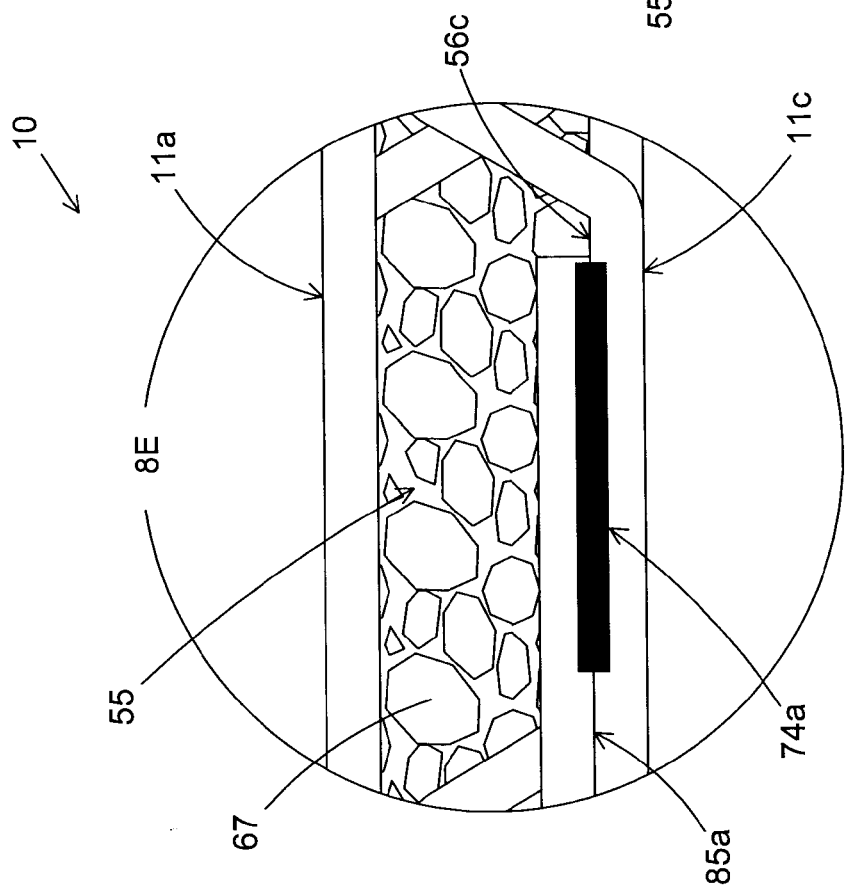
FIGURE 8F
FIGURE 8E

NON-WOVEN DOUBLE-LAYER INDUSTRIAL TEXTILE ASSEMBLED FROM SLEEVE CONFIGURATION PANELS, AND PANELS THEREFOR

CROSS-REFERENCE TO RELATED APPLICATIONS

This application is a Submission under 35 U.S.C. §371 for U.S. National Stage Patent Application of, and claims priority to, International Application Number PCT/CA2014/000864, filed Dec. 5, 2014, entitled "NON-WOVEN DOUBLE-LAYER INDUSTRIAL TEXTILE ASSEMBLED FROM SLEEVE CONFIGURATION PANELS, AND PANELS THEREFOR", which is related to and claims priority to Canadian Patent Application Number 2,835,951, filed Dec. 6, 2013, the entire contents of both of which are hereby incorporated herein by reference.

TECHNICAL FIELD

This article relates to industrial textiles. In particular, it relates to a double layer non-woven industrial textile formed from the interconnection of panels formed from suitable sheet or film materials.

BACKGROUND

Non-woven industrial textiles formed from one or more layers of sheet or film materials have been disclosed in U.S. Pat. Nos. 8,454,800, 8,394,239 and 8,388,812; U.S. Patent Application Publication Nos. 2013/0081772, 2012/0027997; 2012/0021171; 2011/0272112 and 2010/0239814. These non-woven industrial textiles can be formed from a polymeric film that includes through apertures that provide porosity through the textile. Alternatively, the textiles can be produced by spirally winding strips of polymeric material and joining the adjoining sides of the strips of material using ultrasonic welding or laser welding techniques. A textile formed in this manner is perforated to make it permeable to air and/or water. However, such textiles are not easily seamed; and there is no internal structure that helps to maintain a separation and void volume between layers of panels.

U.S. Pat. Nos. 8,784,615; 8,815,057; and U.S. Patent Application Publication No. 2012/0021178; and PCT Patent Application Publication Nos. WO 2005/042836; WO 2008/145420; WO 2014/001172; WO 2013/010678 and WO 2012/123439 all disclose various arrangements to provide a continuous belt for use as an industrial textile; in particular, as a papermaking fabric. In some embodiments, the fabric is formed from one or more lengthwise oriented strips of a perforated film material that are joined edge to edge. However, such arrangements may not readily provide adequate flexibility and permeability of the entire non-woven industrial textile. Furthermore, the component strips are difficult to assemble and seam. U.S. Pat. No. 8,563,114 discloses an industrial textile formed from two interconnected layers of a polymer film that is contoured by an embossing process that raises portions of the film above its general plane. Slits are then precision cut through the film to create apertures in the raised portions to provide for liquid drainage or air passage through the textile. Each layer of film is selectively slit and embossed to provide a plurality of regularly arranged protrusions extending from a first planar surface of the film outwardly from the opposing second surface and in which protrusions the apertures are located. The resulting textile is formed from a plurality of similarly profiled strips of film interconnected to provide a two layer film assembly. The strips are either offset over one another and interconnected by bonding, butt joined along the longitudinal side edges by a welding or similar bonding process, or are interconnected by inserting a filamentary material across their width through aligned apertures passing through arrays of similar protrusions. The resulting textile is then rendered endless and seamed using a seaming element such as disclosed in US 2012/0040150, or other similar seaming elements.

It would be desirable if the component strips disclosed in U.S. Pat. No. 8,563,114 could be joined in a manner such that the exposed edges of the strips were removed from the wear plane of the textile, and thereby removed from exposure to abrasion or fraying due to use of the textile in machines or processes.

It has now been found that non-woven industrial textiles can be constructed from a plurality of panels interconnected in a novel manner to internalize end regions.

SUMMARY

In one aspect of the present invention, there is provided a panel for use in construction of a non-woven industrial textile, the panel comprising:
  a) an inner surface and an outer surface;
  b) two opposing lateral edges and two opposing outer edges;
  c) first and second fold regions at each end of the panel, each fold region comprising: an outer edge of the panel; an edge region; a column of hem loop strips and hem slots, the column oriented parallel to the outer edge and set adjacent the edge region; and a hem fold line substantially midway through the column of hem loop strips and hem slots, the hem fold line oriented parallel to the outer edge; and
  d) a body region in between the first and second fold regions, the body region comprising: a plurality of protrusions and land areas on the inner surface of the panel, with a land area in between each protrusion; first and second seam regions, each seam region comprising: a column of seam slots and seam loop strips, the column oriented parallel to the outer edge; and a seam fold line substantially midway through the column of seam loop strips and seam slots, oriented parallel to the outer edge; first and second end body regions, the first end body region between the first fold region and the first seam fold line; the second end body region between the second fold region and the second seam fold line; and a central body region in between the first and second seam fold lines;
wherein the panel forms a folded panel when the panel is: first folded along each hem fold line such that each outer edge is oriented towards the inner surface of the panel, each hem loop strip forms a hem loop, and each hem slot forms a hem loop-receiving opening for receipt of a hem loop of the opposite fold region; then subsequently folded along each seam fold line such that the inner surface of the panel at each end body region is oriented opposite the inner surface of the panel at the central body region; the first and second fold regions are interconnected at a hem region and nestled between the central body region and the respective end body regions; each seam loop strip forms a seam loop; each seam slot forms a seam loop-receiving opening for receipt of a seam loop of an adjacent folded panel; the combined end body regions form a first layer of the folded panel, the central body region forms a second layer of the folded panel; and the first layer is secured to the second layer by securing protrusions in the first layer to opposite land areas in the second layer and/or securing protrusions in the second layer to opposite land areas in the first layer.

The plurality of protrusions can be arranged in a series of columns parallel to each column of seam loop strips and seam slots. With regards to structure, each protrusion can include a surface parallel to the inner surface of the folded panel. Furthermore, each protrusion may include at least one lateral aperture, or two lateral apertures. The one or more lateral apertures provide a flow path for fluid and/or air to pass between the outer surface and the inner surface of the panel.

The central body region and the end body regions can be further secured together by insertion of foam in between the first and second layers. A porous open cell foam or a closed cell foam are examples of suitable foams that can be used.

Where the protrusions have two lateral apertures, the central body region and the end body regions can be further secured together by at a filamentary member that passes through aligned apertures of a column of protrusions in the first layer staggered with a column of apertures in the second layer.

With reference to the hem slots, each hem slot may be dimensioned to receive at least one of the protrusions. In addition, each hem slot can be aligned with a corresponding protrusion proximate the fold region.

In the folded panel, each edge region can be secured to an inner surface of its own fold region, with the fold regions secured together by a hem connecting member placed in a hem channel formed by the interconnected fold regions. This configuration is referred to as a rope hem.

Alternatively, each fold region can be folded into a U-shape, and the fold regions can then be secured together by at least one of: a) a hem connecting member placed in a hem channel formed by the interconnected fold regions; and b) each edge region is secured to the inner surface of the opposite end body region. In this instance, a spacer member can be secured within at least one fold region.

Whether a rope hem or a U-shape hem is used, the hem connecting member can be selected from the group consisting of a pin, a monofilament, a pintle, a multifilament, and a metal wire.

In terms of panel composition, the panel can comprise a thermoplastic material, a thermoset material or a formable metal.

Where the panel comprises a thermoplastic material, the thermoplastic material can be selected from the group consisting of a polyester, a polyamide, a polyolefin, a polyphenylene sulfide and a polyaryletherketone; and a chemical method, a thermal method, a mechanical method, or a combination thereof is used to secure components of the folded panel. For example, the edge regions and/or the spacer member can be secured by laser welding. Furthermore, the panel may further comprise an additive, a radiant-energy absorbent material, or a combination thereof. As an example, the radiant-energy absorbing material can be carbon black, and the additive can be titanium dioxide.

The panel may comprise at least one layer of a film comprising material selected from the group consisting of polyethylene terephthalate (PET), polybutylene terephthalate (PBT), polyethylene (PE), polyethylene naphthalate (PEN), polypropylene (PP), polyphenylene sulphide (PPS), polyether ether ketone (PEEK), poly(cyclohexylene dimethylene terephthalate) acid (PCTA), polyamide-6 (PA-6), PA-6/6, PA-6/10 and PA-6/12. As an example, the film may comprise a biaxially oriented, hydrolysis-stabilized PET film. In addition, at least one layer of the film can include an additive, a radiant-energy absorbent material, or a combination thereof.

Where the panel comprises a formable metal material, the formable metal material can be selected from the group consisting of an aluminum alloy, brass, cold rolled steel, copper, galvanized steel, high-strength low alloy steel, hot rolled steel, steel alloy, stainless steel zinc and any combination thereof; and a chemical method, a thermal method, a mechanical method, or a combination thereof is used to secure components of each folded panel.

Where the panel comprises a thermoset material, the thermoset material can be a linear polyimide or an aromatic heterocyclic polyimide; and a chemical method, a mechanical method, or a combination thereof is used to secure components of each folded panel.

In order to minimize adherence to external contaminants, at least part of the outer surface of the panel in the central body region can have surface roughness. For example, the surface roughness can be between 5 $\mu$ and 100 $\mu$, and can have the form of striations.

In another aspect of the present invention, there is provided a double-layer non-woven industrial textile constructed from a plurality of folded panels secured adjacently in series, wherein each folded panel is formed as described above; adjacent folded panels are interconnected at a composite seam region, the composite seam region formed by insertion of the seam loops of a first folded panel into the seam loop-receiving openings of a second folded panel and the seam loops of the second folded panel into the seam loop-receiving openings of the first folded panel, thereby forming a seam channel at the composite seam region; and the adjacent folded panels are secured to each other by insertion of a seam connecting member in the seam channel between the adjacent folded panels.

Within each folded panel, the plurality of protrusions can be arranged in a series of columns parallel to each column of seam loop strips and seam slots. In addition, each protrusion can include at least one lateral aperture, or two lateral apertures. The lateral aperture provides a flow path for fluid and/or air to pass between the outer surface and the inner surface of each folded panel.

Within the textile, the central body region and the end body regions of at least one of the folded panels can be further secured together by insertion of foam in between the first and second layers. Examples of suitable foams are as described above.

Within the textile, the central body region and the end body regions of at least one folded panel can be further secured together by at least one filamentary member that passes through aligned apertures of a column of protrusions in the first layer staggered with a column of protrusions in the second layer.

In addition, in each folded panel of the textile, each hem slot can be dimensioned to receive at least one of the protrusions. It is also possible that each hem slot is aligned with a corresponding protrusion proximate the fold region.

Within the textile, each folded panel can have either a rope hem or a U-shape hem, as described above, and securement is as described above.

Furthermore, the composition of each folded panel within the textile is as described above, while the textile can have surface roughness on a part of its outer surface, or on its entire outer surface. Examples of surface roughness are as described above.

The textile can have different types of panels across its width. For example, additional exterior folded panels can be secured to at least one of the first and second lateral edges of each folded panel, such that the material of the additional exterior folded panels is different from the material of each folded panel. For example, the additional exterior folded panels may comprise a heat-resistant material or wear-resistant material, such as PPS, PEEK, a formable metal or a hydrolysis-stabilized thermoplastic material.

In yet another aspect of the present invention, there is provided a panel for use in construction of a non-woven industrial textile, the panel comprising:
a) at least one layer of polymer film of oriented PET which includes a radiant-energy absorbing material;
b) an inner surface and an outer surface;
c) two opposing lateral edges and two opposing outer edges;
d) first and second fold regions at each end of the panel, each fold region comprising: an outer edge of the panel; an edge region; a column of hem loop strips and hem slots, the column oriented parallel to the outer edge and set adjacent the edge region; and a hem fold line substantially midway through the column of hem loop strips and hem slots, the hem fold line oriented parallel to the outer edge; and
e) a body region in between the first and second fold regions, the body region comprising: a plurality of protrusions and land areas on the inner surface of the panel, with each protrusion having at least one aperture, and a land area in between each protrusion; first and second seam regions, each seam region comprising: a column of seam slots and seam loop strips, the column oriented parallel to the outer edge; and a seam fold line substantially midway through the column of seam loop strips and seam slots, oriented parallel to the outer edge; first and second end body regions, the first end body region between the first fold region and the first seam fold line; the second end body region between the second fold region and the second seam fold line; and a central body region in between the first and second seam fold lines;
wherein the panel forms a folded panel when the panel is first folded along each hem fold line such that each outer edge is oriented towards the inner surface of the panel, each hem loop strip forms a hem loop, and each hem slot forms a hem loop-receiving opening for receipt of a hem loop of the opposite fold region; and then subsequently folded along each seam fold line such that the inner surface of the panel at each end body region is oriented opposite the inner surface of the panel at the central body region; the first and second fold regions are interconnected at a hem region and nestled between the central body region and the respective end body regions; each seam loop strip forms a seam loop; each seam slot forms a seam loop-receiving opening for receipt of a seam loop of an adjacent folded panel; the central body region forms a first layer of the folded panel, the combined end body regions form a second layer of the folded panel; and the first layer is secured to the second layer by securing protrusions in the first layer to opposite land areas in the second layer and/or securing protrusions in the second layer to opposite land areas in the first layer.

In this panel, the polymer film can be biaxially oriented and/or hydrolysis stabilized.

Furthermore, the panel can comprise at least two co-extruded layers of polymer film, and one of the at least two co-extruded layers may include a radiant energy absorbing material. As an example, the radiant energy absorbing material can be carbon black.

BRIEF DESCRIPTION OF THE DRAWINGS

FIG. 2B is a perspective view of FIG. 2A, while FIG. 2D is a perspective view of FIG. 2C.

FIG. 3C is an enlarged view of the circled area 3C in FIG. 3A.

FIG. 8B is an enlarged view of the circled area 8B shown in FIG. 8.

FIG. 8C is an enlarged view of the circled area 8C shown in FIG. 8.

FIG. 8E is an enlarged view of the circled area 8E shown in FIG. 8.

FIG. 8F is an enlarged view of the circled area 8F shown in FIG. 8.

DETAILED DESCRIPTION

The detailed description set forth below in connection with the drawings is intended as a description of embodiments of a panel and double-layered non-woven industrial textile (constructed from these panels) and is not intended to represent the only forms in which the panel may be constructed or utilized. It is to be understood that the same or equivalent functions and structures may be accomplished by different embodiments that are also intended to be encompassed within the spirit and scope of the invention. As denoted elsewhere herein, like element numbers indicate like elements or features.

For the sake of brevity, "double-layer non-woven industrial textile" will simply be referred to as "textile" in the detailed description and the parts list.

Folded Panel

Figure 1:
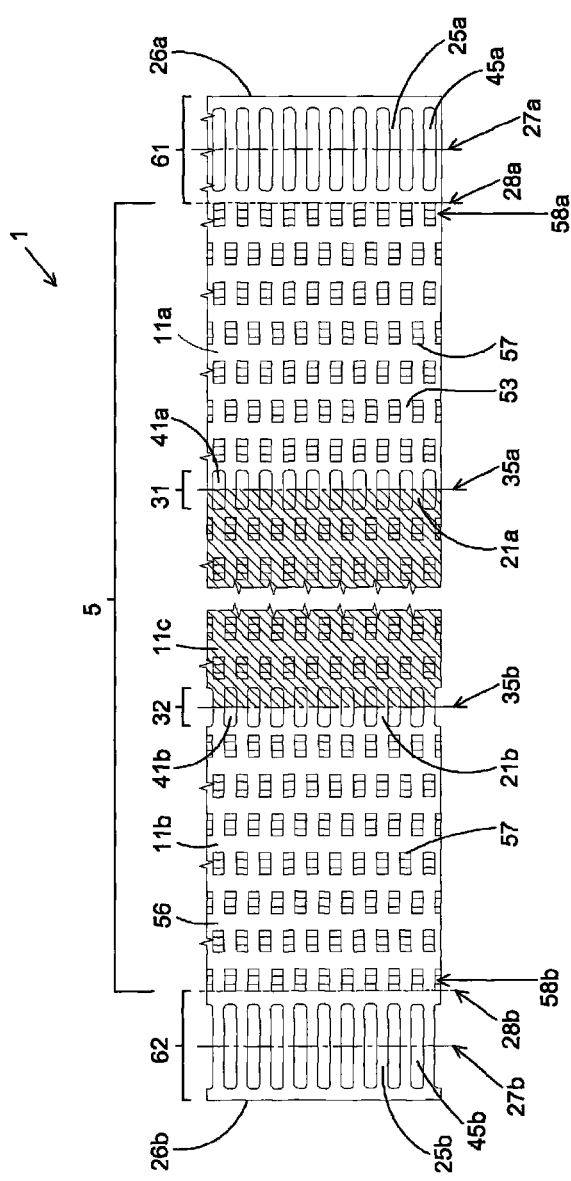
FIG. 1 is a top view of an embodiment of a panel for use in the construction of a double-layer non-woven industrial textile.

FIG. 1 is a top view of an embodiment of a panel (1) for use in the textile. Panel (1) can be manufactured to any width and length. However, for some applications, the distance (or panel length) between outer edges (26a) and (26b) can be between 0.5 m and 1.0 m while the distance (or panel width) along the outer edge (e.g. 26a, 26b) can be as large as required. For example, the panel width can be approximately equal to the required textile width.

Panel (1) includes a body region (5) located in between first and second fold regions (61, 62).

Each fold region (61, 62) includes an outer edge (26a, 26b), an inner edge (28a, 28b), a column of hem slots (45a, 45b) and hem loop strips (25a, 25b); and a hem fold line (27a, 27b) midway through the column of hem slots (45a, 45b) and hem loop strips (25a, 25b). As discussed further below, hem slots (45a, 45b) and hem loop strips (25a, 25b) will be used to hem the fold regions (61, 62) of the panel (1).

The body region (5) extends between first and second inner edges (28a, 28b). Body region (5) also includes first and second seam columns of seam slots (41a, 41b) and seam loop strips (21a, 21b), with a seam fold line (35a, 35b) midway between each seam column. First and second seam regions (31, 32) are defined by the respective seam slots (41a, 41b), seam loop strips (21a, 21b) and seam fold lines (35a, 35b). As discussed further below, seam slots (41a, 41b) and seam loop strips (21a, 21b) will be used to define a seam between adjacent folded panels.

Body region (5) can also be defined in terms of first and second end body regions (11a, 11b) and a central body region (11c). For the sake of greater clarity, hatching has been used to depict the inner surface of central body region (11c); this hatching does not imply that the composition of (11c) differs from that of end body regions (11a, 11 b). Each end body region (11a, 11b) extends between its respective inner edge (28a, 28b) and seam fold line (35a, 35b), while the central body region (11c) extends between the first and second seam fold lines (35a) and (35b). End body regions (11a, 11b) are generally equal in length (i.e. the respective distances between inner edge (28a, 28b) and seam fold lines (35a, 35b)). The combined length of each end body region (11a, 11b) can approximately equal the length (i.e. the distance between seam fold lines (35a, 35b)) of the central body region (11c).

Figure 2A:
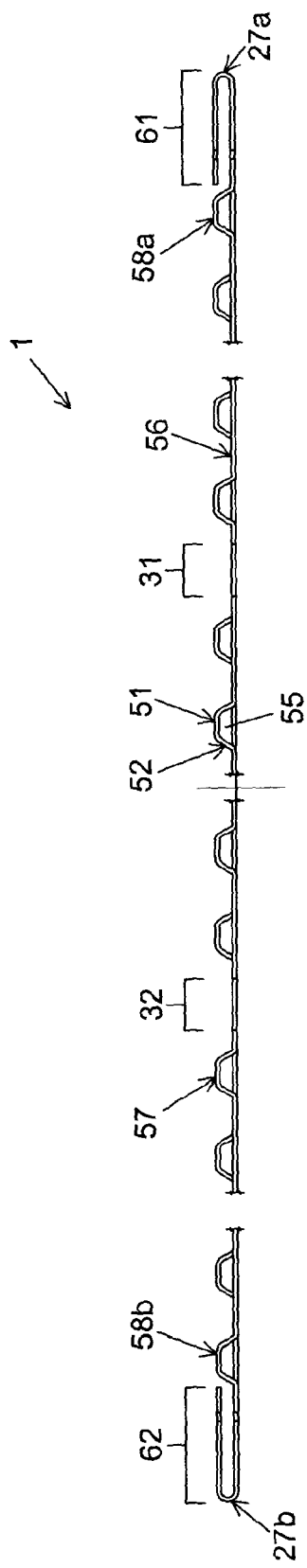
FIGS. 2A to 2D illustrate successive folding steps of the panel in FIG. 1.

Body region (5) includes a series of columns of protrusions (57), with a land channel (56) in between each column. Protrusions (57) within a column are separated by a land area (53). As shown in FIG. 2A. Protrusions (57) protrude outward from the inner surface of the panel (1). The protrusions (57) can be embossed throughout leaving depressions on the outer surface of panel (1). Protrusions (58a, 58b) are proximate the inner edge (28a, 28b) of each fold region (61, 62). In this embodiment, the columns of protrusions (57) across the length of panel (1) are staggered (in a 1-2-1-2 . . . pattern), while in each fold region (61, 62), each hem slot (45a, 45b) is directly across a protrusion (58a, 58b) proximate the inner edge (28a, 28b). While protrusions (57) are arranged in regular columns oriented parallel to the seam fold lines (35a, 35b), other spatial arrangements of the protrusions may be possible such as offset (in relation to one another). In addition, protrusions (57) may all have the same size and shape, although other embossing patterns and protrusion shapes, such as those disclosed in WO 2013/181748, WO 2013/188964, WO 2014/053055 or WO 2014153644 (all of which are incorporated by reference) may be used.

Figure 2B:
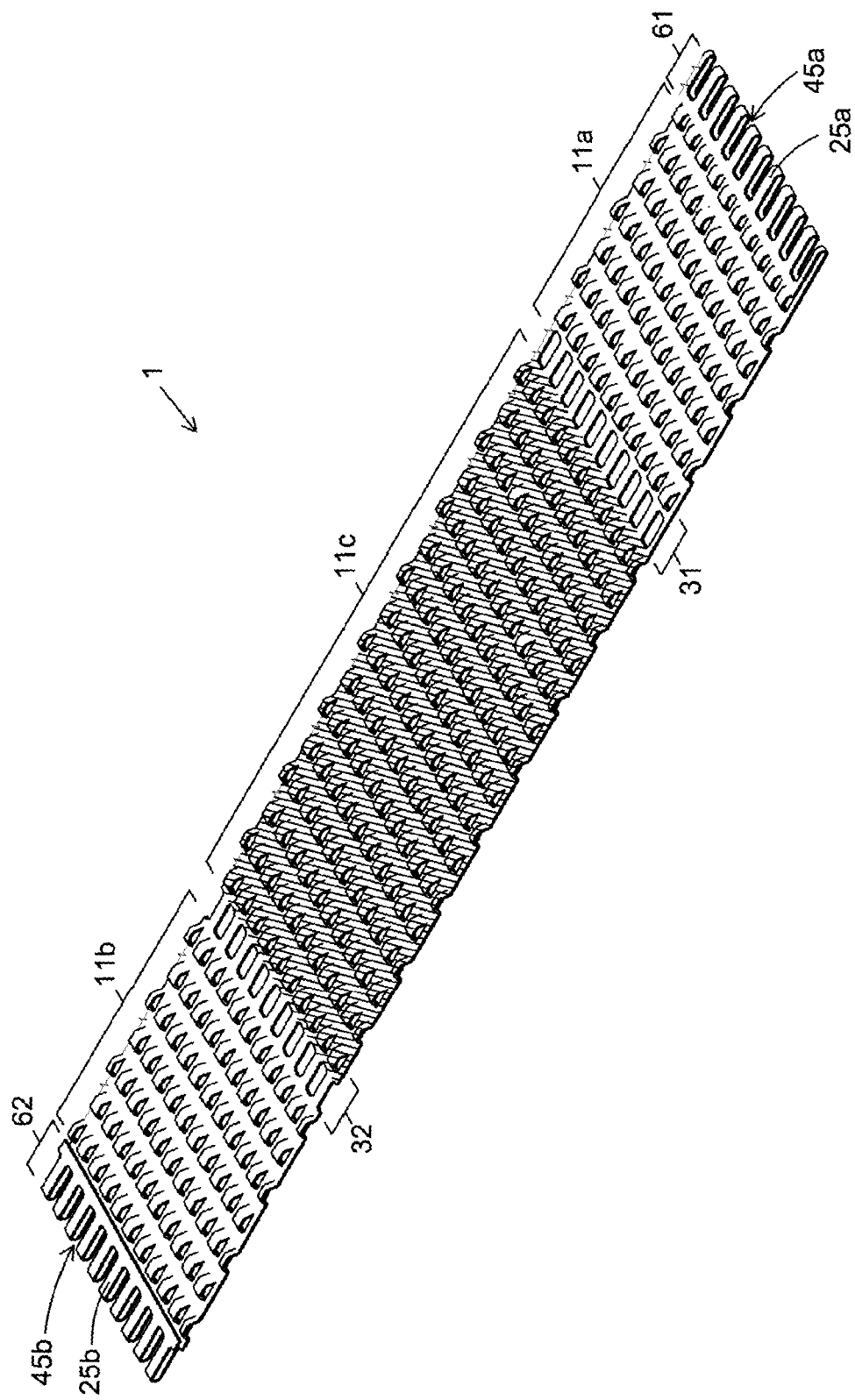

FIG. 2A illustrates a side view of the panel (1) of FIG. 1 showing the first folding step of the panel (1). FIG. 2B is a perspective view of FIG. 2A.

The protrusions (57) can be further slit on their lateral sides in a precision slitting process to form apertures (55), as shown in FIG. 2A. Each protrusion (57) includes a surface (51) supported by side surfaces (52), with an aperture (55) on one or both lateral sides. Furthermore, it is seen that the inner surface in body region (5) forms a continuous outwardly profiled surface with depressions on the outer surface thereof. Apertures (55) allow for movement of fluid and/or air from one panel surface through to the other surface in the folded panel, while also providing a passageway (across the width of the folded panel) that can receive a filamentary element to allow for mechanical securement of the central body region with (11c) with two opposite end body regions (11a, 11b). This feature is discussed further below.

With reference to FIGS. 2A and 2B, panel (1) is folded along each fold line (27a, 27b), such that each fold region (61, 62) is folded into a U-shape. Each outer edge (26a, 26b) (shown in FIG. 1) is folded towards the inner surface of the panel (1), and is approximately above the respective inner edge (28a, 28b) (see FIG. 1). This folding process forms hem loops (25a, 25b) alternating with hem loop-receiving openings (45a, 45b).

Figure 2C:
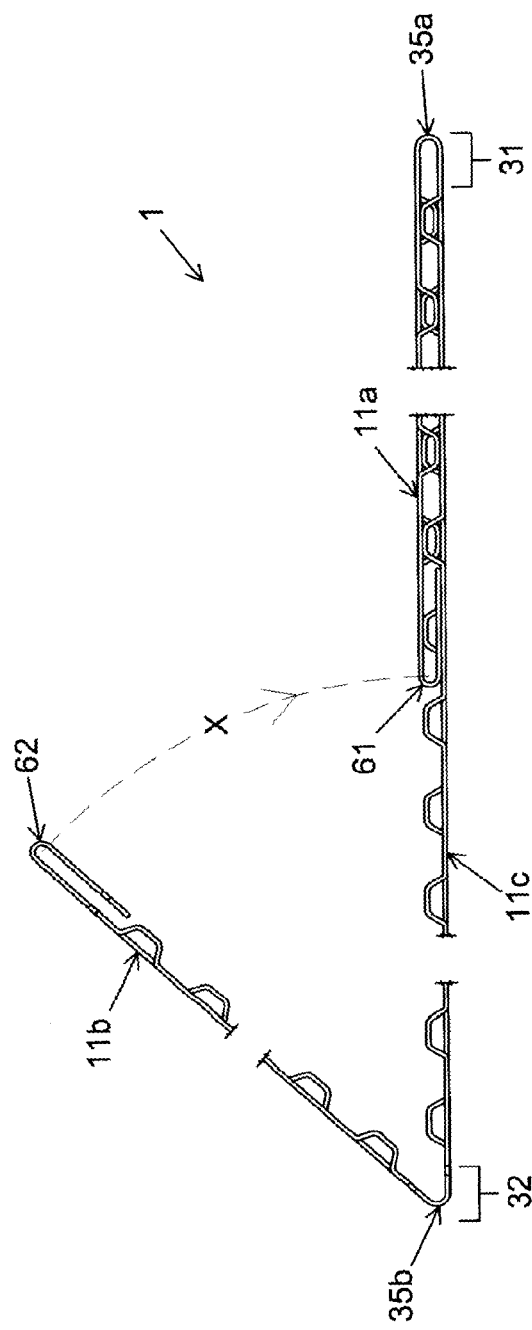
Figure 2D:
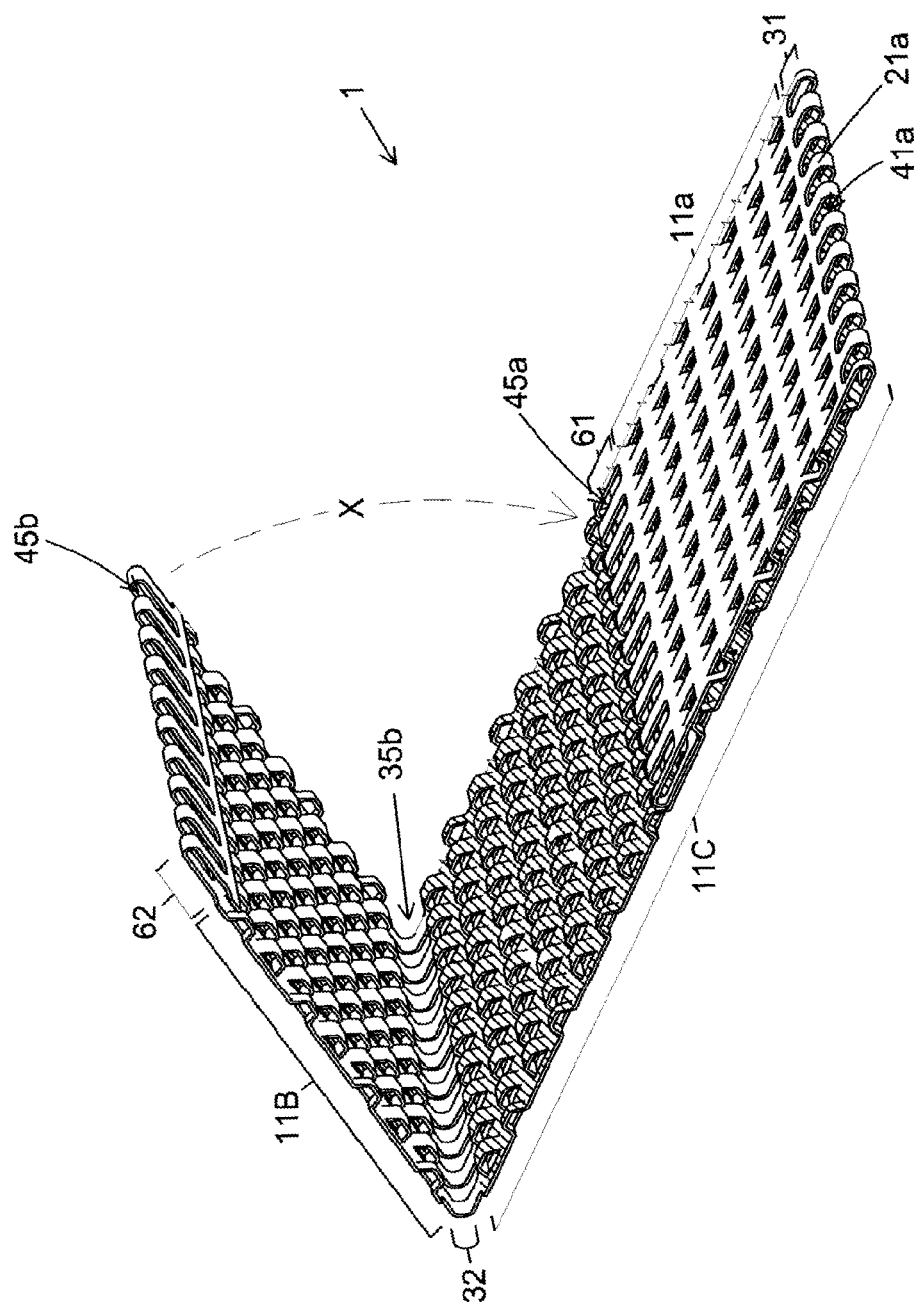

FIGS. 2C and 2D illustrate a subsequent folding of panel (1) after the initial folding step shown in FIGS. 2A and 2B. Panel (1) is folded along seam fold lines (35a, 35b), such that each end body region (11a, 11b) is folded toward central body region (11c). This folding step results in the formation of seam loops (21a, 21b) and seam loop-receiving openings (41a, 41b) at each end of panel (1) (note that only (21a) and (41a) are shown in FIG. 2D). With reference to FIGS. 2C and 2D, end body region (11b) is being folded along the arc marked 'X', while end body region (11a) has been completely folded so that it is in contact with central body region (11c). Fold region (61) is nestled approximately at a midway point of central body region (11c), with hem loops (45a) receiving protrusions (57) from the central body region (11c). Similarly, once end body region (11b) is completely folded, fold region (62) will be nestled approximately at a midway point of central body region (11c), with hem loops (45b) receiving protrusions (57) from the central body region (11c). Fold regions (61, 62) can be secured to the central body region (11c) in a manner described below.

In the folded panel, columns of protrusions from end body regions (11a, 11b) generally overlap in a staggered formation with columns of protrusions from the central body region (11c), such that the surface (51) of a protrusion (57) contacts an opposite land area (53). This is discussed in greater detail below.

Figure 3A:
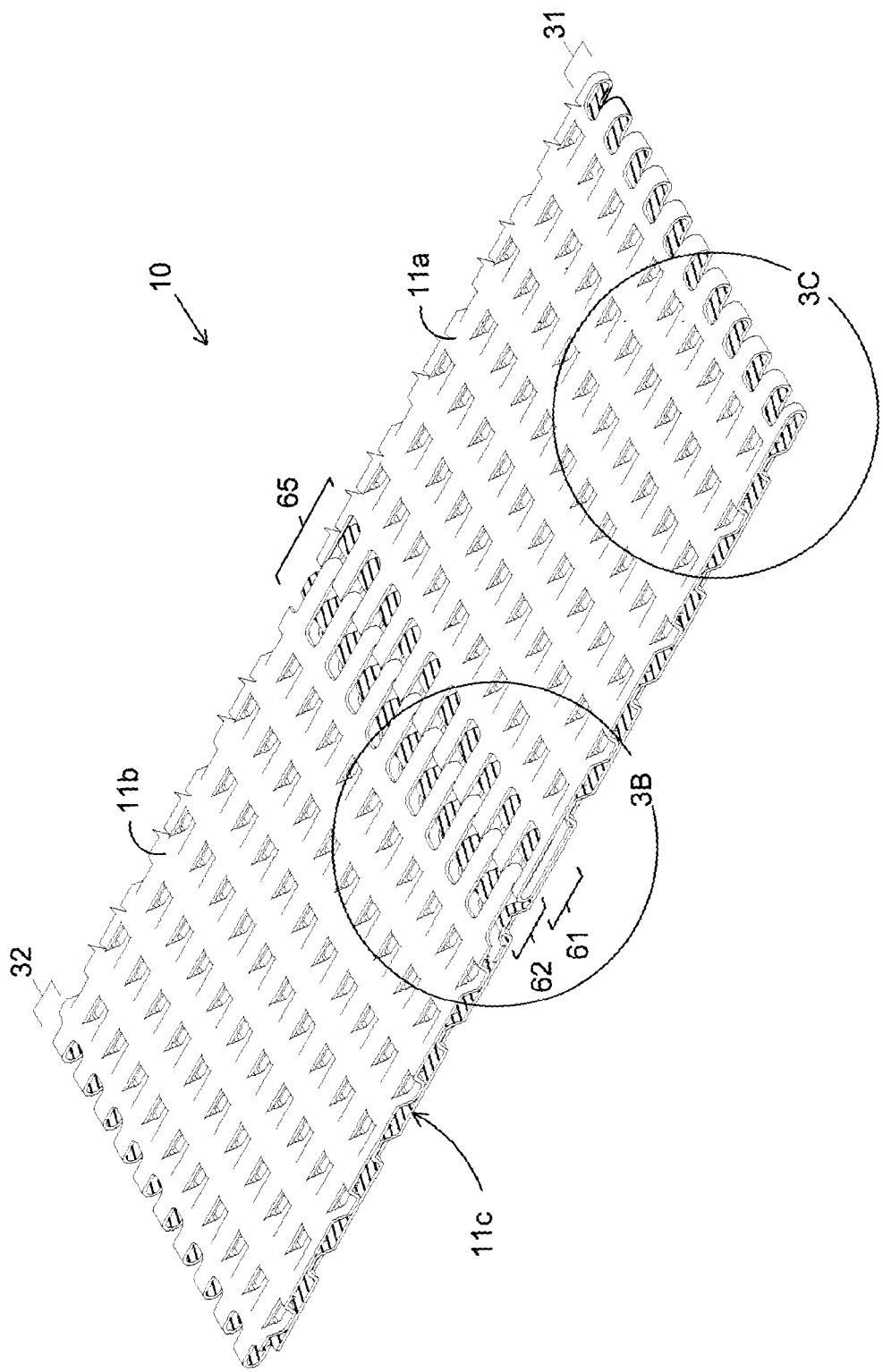
FIG. 3A is a perspective view of the panel shown in FIG. 1 in a fully folded configuration.

FIG. 3A illustrates the folded panel (10) once both end body regions (11a, 11 b) are brought into contact with the central body region (11c), following the folding process illustrated in FIGS. 2A to 2D. Hem region (65) is defined as the overlap of fold regions (61, 62). With reference to FIG. 3A, end body regions (11a, 11b) form a first layer of folded panel (10), while central body region (11c) forms a second layer of folded panel (10). When used in an industrial conveying or filtration application, the central body region (11c) may be oriented towards the product-conveying side of the industrial textile so that hem region (65) is oriented towards the machine.

Figure 3B:
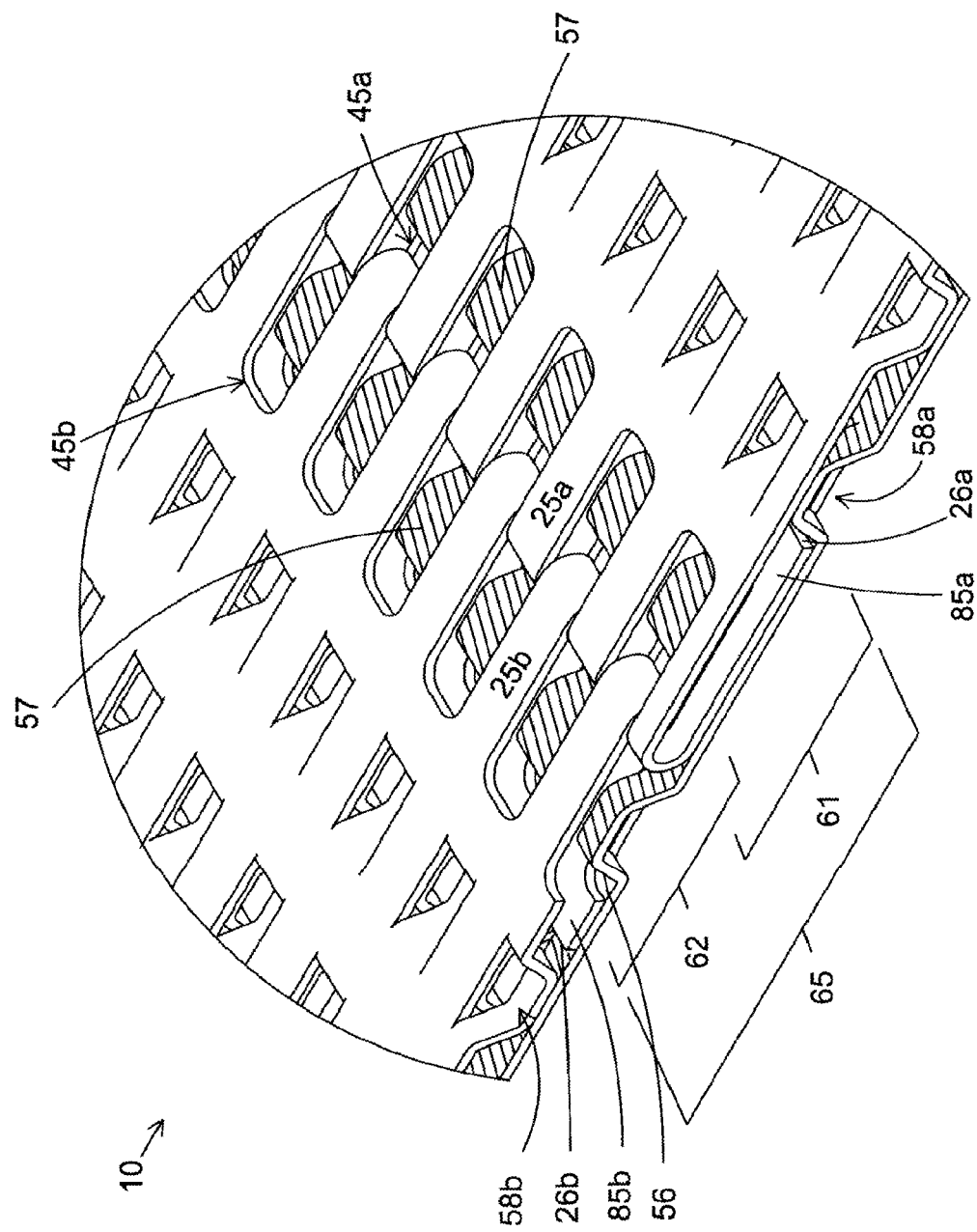
FIG. 3B is an enlarged view of the circled area 3B of FIG. 3A

FIG. 3B illustrates in greater detail the hem region (65). Hem loop-receiving openings (45a, 45b) interconnect as follows. Hem loops (25a) of fold region (61) are inserted into hem loop-receiving openings (45b) of fold region (62), while hem loops (25b) of fold region (62) are inserted into hem loop-receiving openings (45a) of fold region (61). Furthermore, hem loop-receiving openings (45a, 45b) are dimensioned so as to receive protrusions (57) from central body region (11c). In addition, outer edges (26a, 26b) are aligned with protrusions (58a, 58b) so that surfaces of edge regions (85a, 85b) are located on the lower planar surface of land channel (56), and secured thereto (as discussed below).

FIG. 3C shows an enlargement of the seam region (31) at which adjacent panels may be joined. Seam region (31) includes a plurality of regularly spaced seam loops (21a) between which are located seam loop-receiving openings (41a). Seam loops (21a) and seam loop-receiving openings (41a) are formed by folding panel (1) at first seam fold line (35a) (shown in FIGS. 2C and 2D), in the manner described above. In addition, seam channel (80) is formed via the seam loops (21a).

Figure 4:
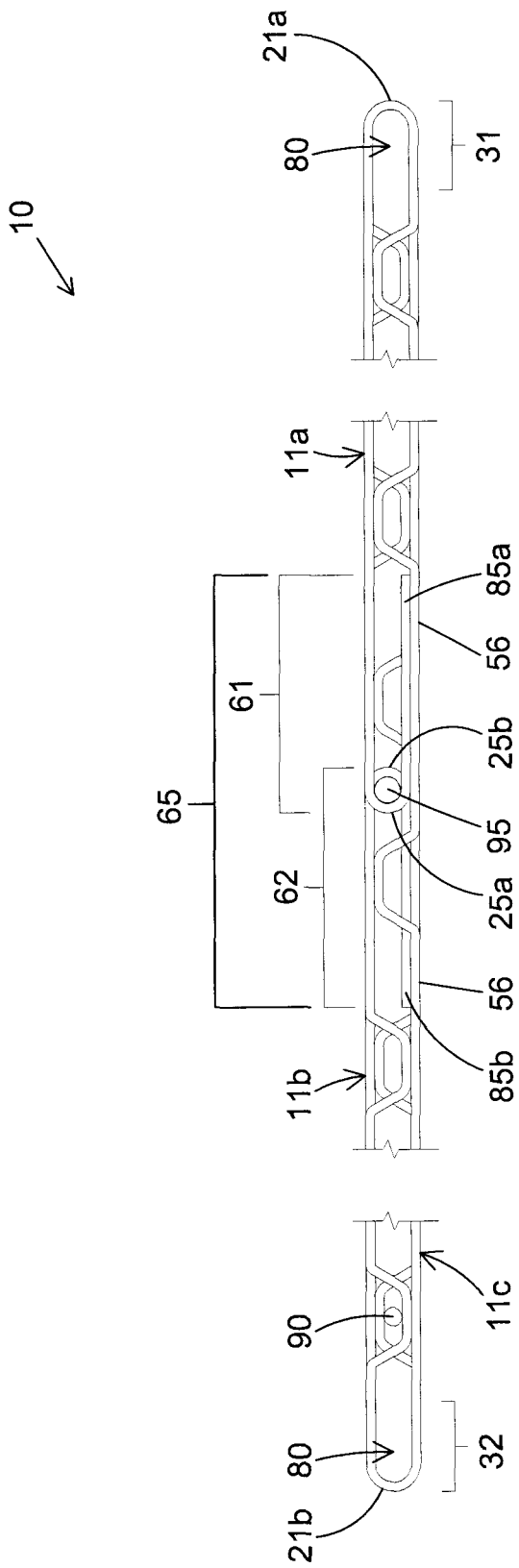
FIG. 4 is a side view of the folded panel shown in FIGS. 3A to 3C.

FIG. 4 is a side view of the folded panel (10) shown in FIGS. 3A to 3C. Hem region (65) includes interconnected fold regions (61, 62), such that hem channel (95) is formed by the overlap of hem loops (25a, 25b). A hem connecting member (shown as (97) in FIGS. 6A and 6B) may be inserted into hem channel (95) to secure the fold regions (61, 62) together. Seam regions (31, 32) include seam loops (21a, 21b). A seam channel (80) is formed within each set of seam loops (21a, 21b). When seam loops of adjacent folded panels interconnect, there is also an overlap of the adjacent seam channels, in which a seam connecting member may be inserted to secure a mechanical connection between adjacent folded panels. This is described in further detail below, and illustrated in FIGS. 6A, 6B and 7.

In addition, edge regions (85a, 85b) can be secured to the inner surface of central body region (11c) at land channel (56), thereby configuring the folded panel (10) into a complete self-contained unit. With reference to FIG. 4, the free ends (i.e. fold regions 61, 62) of the original panel (1) are contained within the first and second layers. That is, edge regions (85a, 85b) are shielded between the inner surfaces of end body regions (11a, 11b) and the inner surface of central body region (11c). Resistance to compression by the folded panel (10) can be enhanced by the optional insertion of a filamentary member (90), or similar material, through one or more aligned apertures (55) in the interior of folded panel (10).

Figure 5:
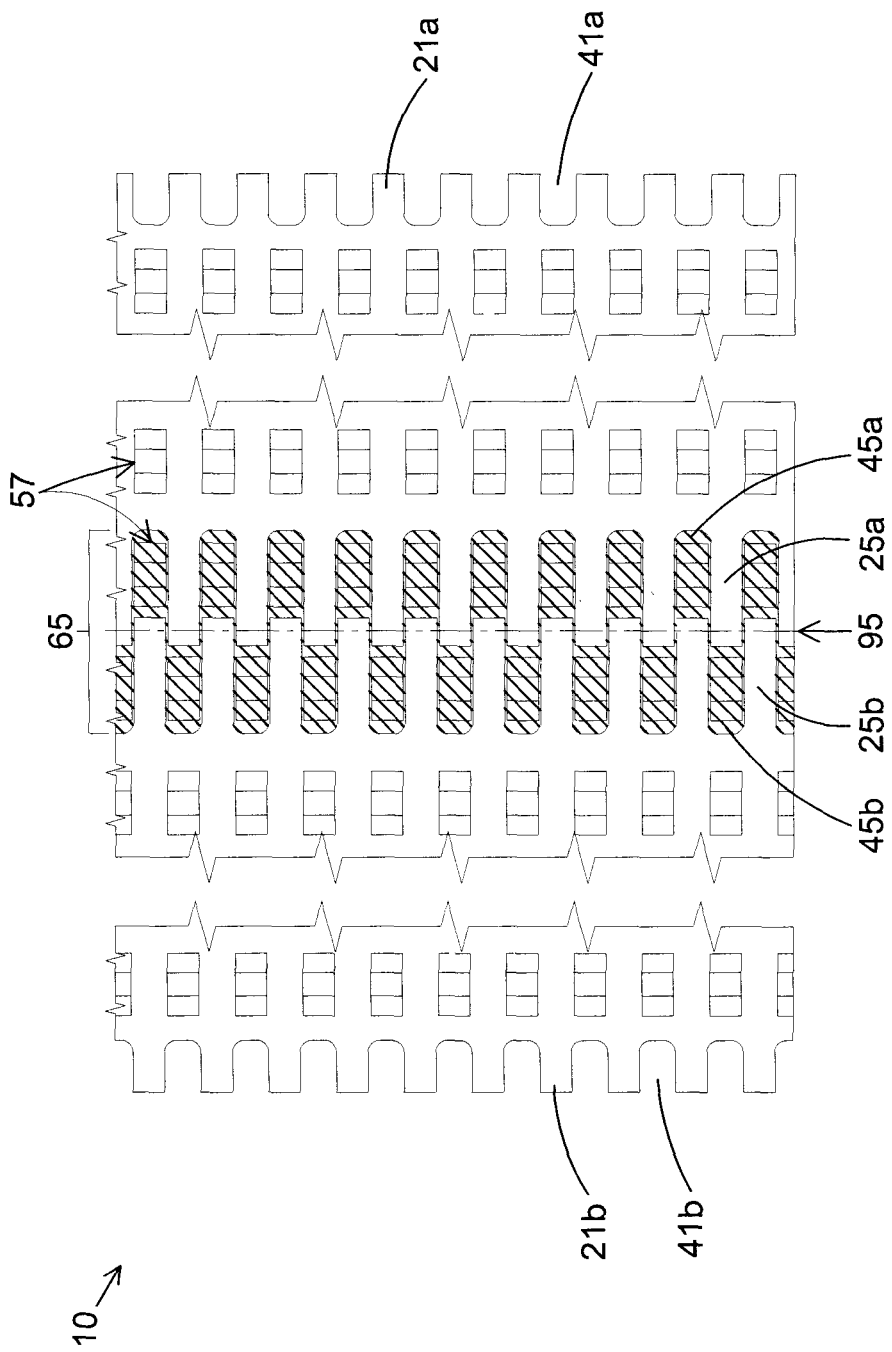
FIG. 5 is a top view of the folded panel shown in FIG. 4.

FIG. 5 is a top view of the folded panel (10) shown in FIG. 4, illustrating the insertion of hem loops (25a, 25b) into corresponding hem loop-receiving openings (45a, 45b). Furthermore, protrusions (57) from central body region (11c) are visible, as they are received by hem loop-receiving openings (45a, 45b). Once interconnected in this manner, a hem channel (95) is formed allowing for receipt of a pintle or monofilament to further secure hem region (65). Optionally, the interconnected hem loops (25a, 25b) can be secured in place using methods described below. Seam loops (21a, 21b) and seam loop-receiving openings (41a, 41b) are located at opposing ends of the folded panel (10), for interconnection with an adjacent folded panel, as described below.

An industrial textile is constructed by interconnection of a series of adjacent folded panels by intermeshing the seam loops and seam loop receiving openings at the seam regions located at opposing ends of the folded panels. This is further illustrated in FIGS. 6A, 6B and 7. The number of folded panels used to build the textile can vary according to the required textile length.

Figure 6A:
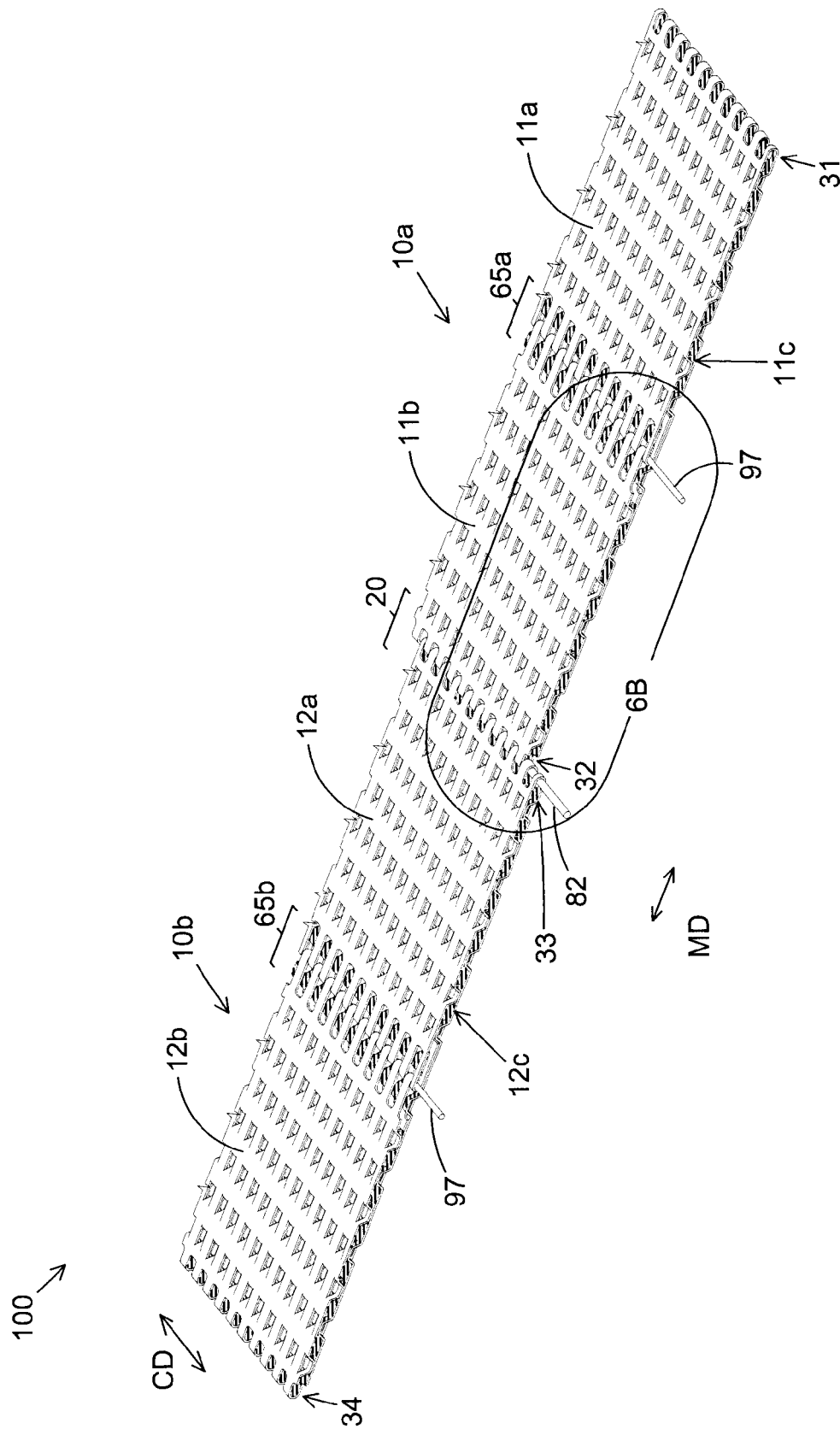
FIG. 6A is a perspective view of a portion of a first embodiment of an industrial textile constructed from a series of interconnecting folded panels, with each folded panel constructed as shown in FIGS. 3A to 3C.

FIG. 6A provides a perspective view of a portion of a first embodiment of an industrial textile (100) constructed from a series of interconnecting folded panels (10a, 10b), in which the two interconnected panels (10a, 10b) are constructed as shown in FIGS. 3A to 3C. In an application of the textile (100), the direction of motion of the textile (100) is indicated by the arrow labeled MD, while the cross-machine direction (CD) is indicated as perpendicular to the MD.

Figure 6B:
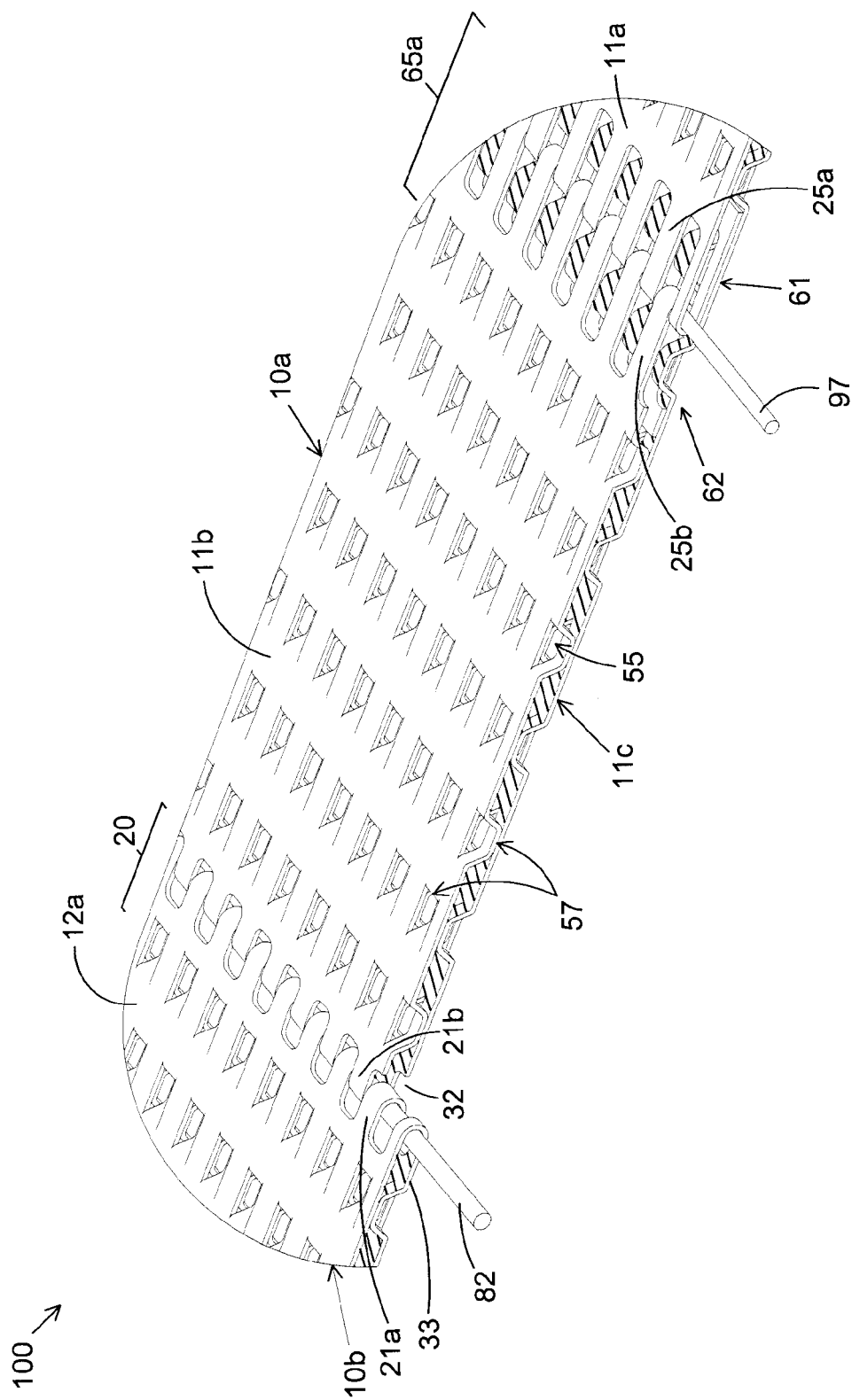
FIG. 6B is an enlarged view of the circled area 6B in FIG. 6A.

With reference to FIGS. 6A and 6B, folded panels (10a, 10b) are interconnected at composite seam region (20), which includes seam loops from seam region (32) of folded panel (10a) interconnected with seam loops from seam region (33) of folded panel (10b) by a seam connecting member (82) (such as a pin, a pintle, a monofilament, or similar member known in the art).

The hem regions (65a, 65b) of panels (10a, 10b) can be further secured by insertion of a hem connecting member (97) such as a monofilament or pin (or similar member known in the art) in the hem channel. When constructing the industrial textile (100), one or more hem connecting members (97) may be used; i.e. it is not necessary to secure all of the hem regions in the textile (100) with a connecting member (97). If a hem connecting member (97) is not used to secure a hem region (e.g. 65a, 65b), then such hem regions (65a, 65b) can be secured in a manner described in relation to FIG. 8. An enlarged view of composite seam region (20) and hem region (65a) of panel (10a) is provided in FIG. 6B.

The end body regions (11a, 11b, 12a, 12b) provide a surface that may face towards the machine on which the industrial textile is used; this surface is referred to as the "machine-side" (MS) surface. Central body regions (11c, 12c) may provide the product conveying side of the industrial textile; this surface is referred to as the "product-side" (PS) surface. The distinction between the MS and PS is due to the location of the hem regions (65a, 65b). That is, the hem regions (65a, 65b) are on the MS.

It is apparent from FIG. 6A that all free ends which could become trapped or pulled during use of the textile (100), are now secured within the textile (100) structure. These is due to the fact that the terminal fold regions (e.g. (61) and (62) in FIG. 6B) are turned inwardly into and secured within the textile (100), and are not exposed directly to machine parts when the textile (100) is in use.

With reference to FIG. 6B, end body regions (11a, 11b) of folded panel (10a) are interconnected at hem region (65a) by means of a hem connecting member (97), such as a monofilament, which is inserted through the interdigitated hem loops (25a, 25b) of fold regions (61, 62). Protrusions (57) on the end and central body regions (11a, 11b, 11c) are oriented towards the interior of folded panel (10a), while the depressions are visible on the outer surfaces of each folded panel (10a, 10b). At least one lateral side of the protrusions (57) includes an aperture opening (55). In folded panel (10a) protrusions (57) of end body regions (11a, 11b) are aligned with those of central body region (11c) such that the apertures (55) allow for movement of fluids, air and materials through the industrial textile (100). Folded panel (10b) is interconnected to folded panel (10a) by intermeshing of seam loops (21a, 21b) to provide a seam channel (not shown) through which seam connecting member (82) can be inserted. Multiple folded panels such as (10a) and (10b) may be interconnected in series in this manner so as to build up the length of the industrial textile (100) as required.

Figure 7:
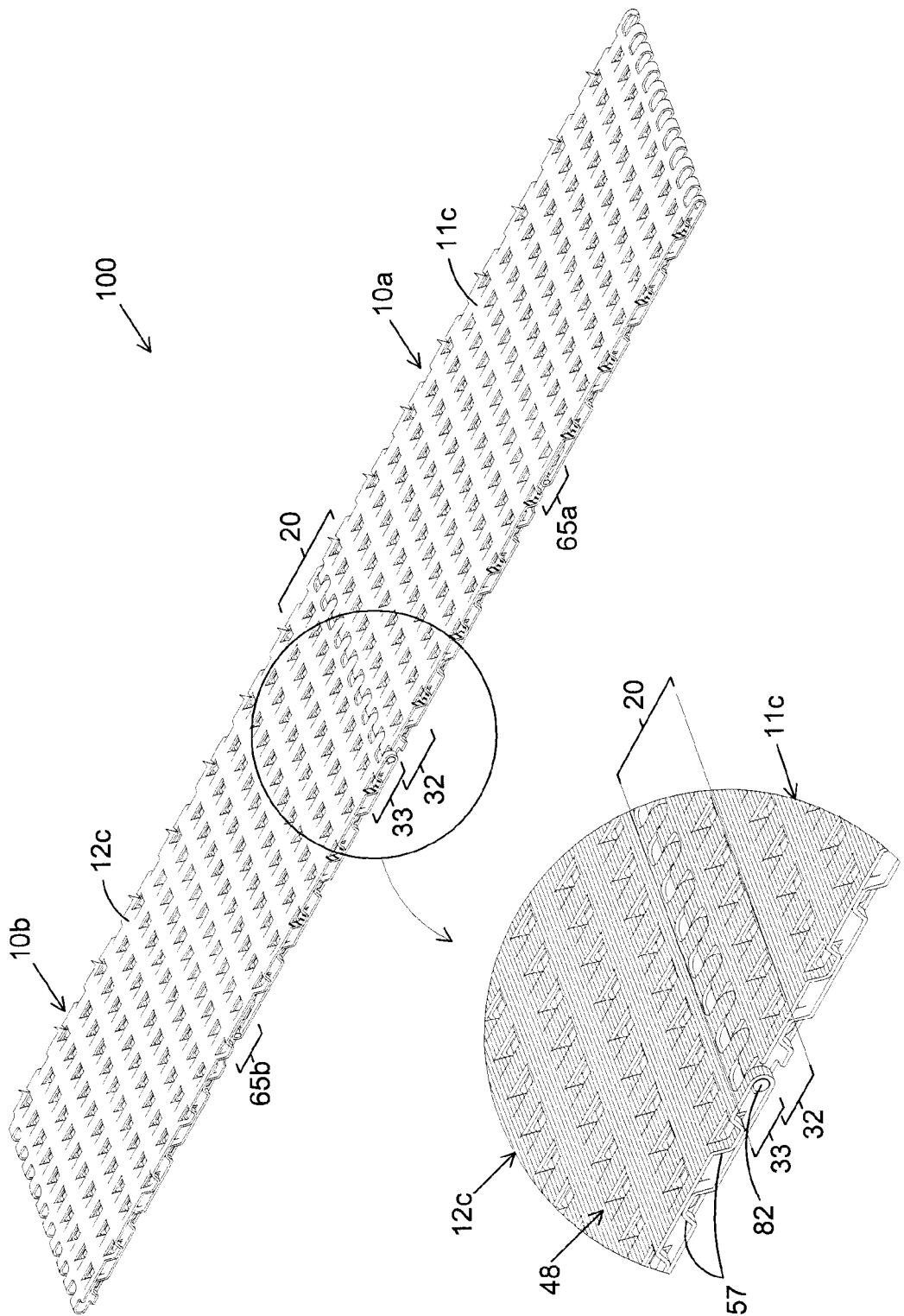
FIG. 7 is a perspective view showing the outer surface of the second layer of two interconnected folded panels shown in FIG. 6A, and magnification of the interconnection region between the two folded panels in which surface roughness has been applied to a portion of the outer surface.

FIG. 7 is a perspective view showing the second surface of the two interconnected panels shown in FIG. 6A, and magnification of the interconnection region between the two folded panels, in which surface roughness has been applied to the outer surface of the central body regions (11c, 12c) of each folded panel (10a, 10b). That is, FIG. 7 is a perspective view of what may be used as the product side (PS) surface of the industrial textile (100) as defined above.

In this view, the hem regions (65a, 65b) are on the opposite machine side (MS) of the textile (100). In the illustrated enlargement, for any given folded panel, protrusions (57) on the inner surface of the PS layer are aligned with, and engage with, corresponding protrusions (57) on the inner surface of the MS layer. A protrusion surface is secured to a corresponding planar land area of an opposing layer, as described in relation to FIG. 8. Seam loops from seam region (32) of panel (10a) are intermeshed with corresponding loop receiving openings in seam region (33) of panel (10b) forming seam channel (80) allowing for the interconnection of the two panels at composite seam region (20) by inserting a pin or pintle (such as (82) as described in FIG. 6B).

The outer surface of the folded panels can have roughness thereon. An example of surface roughness is shown in the magnification of FIG. 7, where a portion of the outer surface of folded panels (10a, 10b) includes striations (48), as an example. Surface roughness is applied to reduce adherence of external contaminants. Other examples of surface roughness are described in U.S. Pat. No. 6,773,786.

Figure 8:
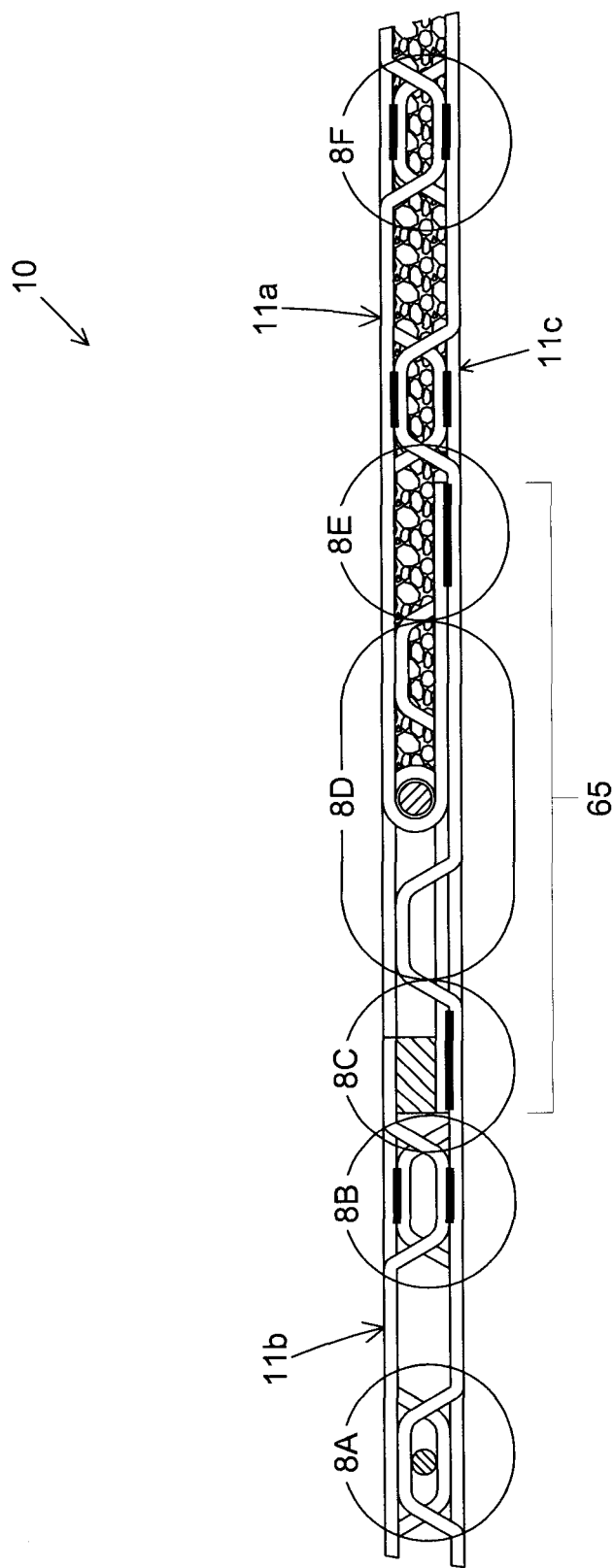
FIG. 8 is a side view of the hem region of the panel shown in FIG. 4, illustrating various internal construction features.

FIG. 8 is a side view of the hem region (65) of the folded panel (10) shown in FIG. 4, illustrating various internal construction features. FIG. 8 is similar to FIG. 4 and illustrates several possible securing methods in each of circled regions 8A through 8F that may be employed to secure the end and central body regions (11a, 11b, and 11c) forming the PS and MS layers of folded panel (10). These will each be discussed in turn.

Figure 8A:
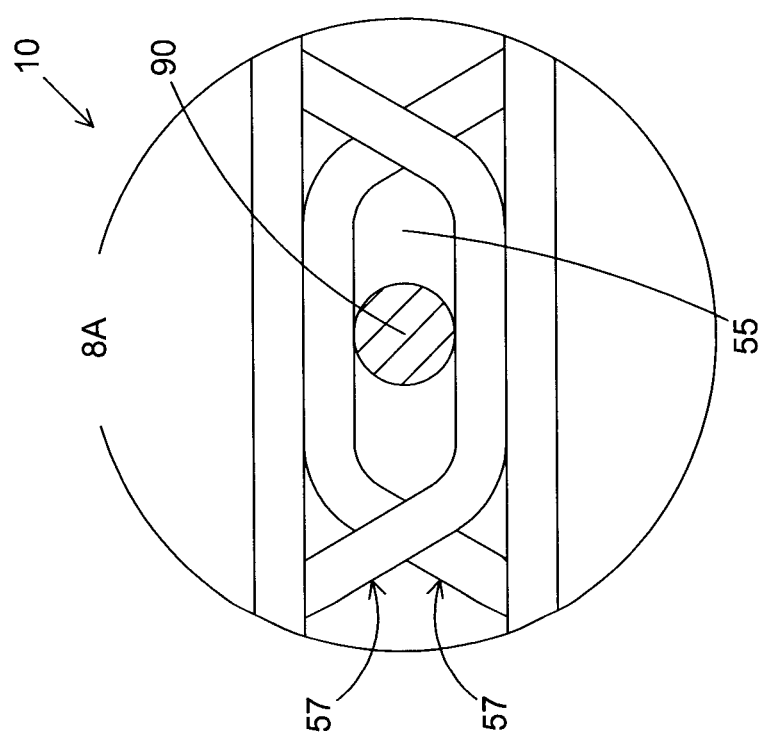
FIG. 8A is an enlarged view of the circled area 8A shown in FIG. 8.

FIG. 8A is an enlargement of circled area 8A in FIG. 8 and illustrates the use of filamentary member (90), such as a monofilament or other yarn, inserted through aligned lateral apertures (55) of engaged protrusions (57) across the width of the interconnected folded panel (10). The filamentary member (90) mechanically interlocks the upper and lower panel layers through their aligned apertures (55) so as to prevent separation. This interconnection process may be repeated across the width and length of the textile at selected locations in order to reinforce the interconnection of the panel layers in the textile, and may be used either in place of, or in addition to, protrusion bonding locations such as (71a, 71b) shown in FIG. 8B.

FIG. 8B is an enlargement of circled area 8B in FIG. 8 illustrating one possible method of interconnecting the end fold regions (11a, 11b) with central body region (11c). Surface (51b) of protrusion (57b) located in end body region (11b) may be secured to the opposing planar area (53c) in central body region (11c), by means of a weld (71b) between these two surfaces. Welding can include, for example, through transmission laser welding (TTLW). Similarly, surface (51c) of protrusion (57c) located in central body region (11c) may be secured to opposing planar area (53b) by a weld at (71c). It is possible to bond a protrusion (57) to an opposing planar area (53) at either (71b), (71c) or both. This can be done for each and every protrusion in the textile but, depending on the intended application, it may only be necessary to weld every second, third or any other number of protrusions in this manner. Alternatively, it is also possible to weld only every second, third or other number of arrays of protrusions to the opposing planar surfaces. TTLW can be used as a securing method when the panel is formed from a thermoplastic, such as polyester. Other bonding methods, including other welding methods (e.g. ultrasonic, vibrational, induction), adhesives (such as chemical solvent adhesives, hot melt adhesives, epoxies and the like) or mechanical fasteners (e.g. inserts, snap-fits, swaging, staking) can be employed when the panel comprises a thermoset or a metal, since laser welding is not feasible in such cases.

FIG. 8C illustrates the use of a spacer member (75) secured within fold region. Spacer member (75) can be placed in contact with edge region (85b) and an inner surface of the fold region, at contact points (e.g. 73b, 73c). One or more spacer members (75) can be used at selected edge regions and may be either continuous or discontinuous across the folded panel (10) width.

Spacer member (75) can be formed from any suitable material, such as a material similar to, or substantially the same as that used to prepare the panels. The spacer member (75) may further comprise a laser weld enabling material, such as a polymeric monofilament, film or the like, which includes a suitable radiant energy absorber. The spacer member (75) should have a height that does not cause significant discontinuity in the otherwise planar surface of the folded panels. In addition, the width of the spacer member (75) should be such as to be accommodated by a land channel. The spacer member (75) can be bonded, for example, by laser welding at each of contact points (73b, 73c). Use of a spacer member (75) is optimal in the assembly of an industrial textile.

Figure 8D:
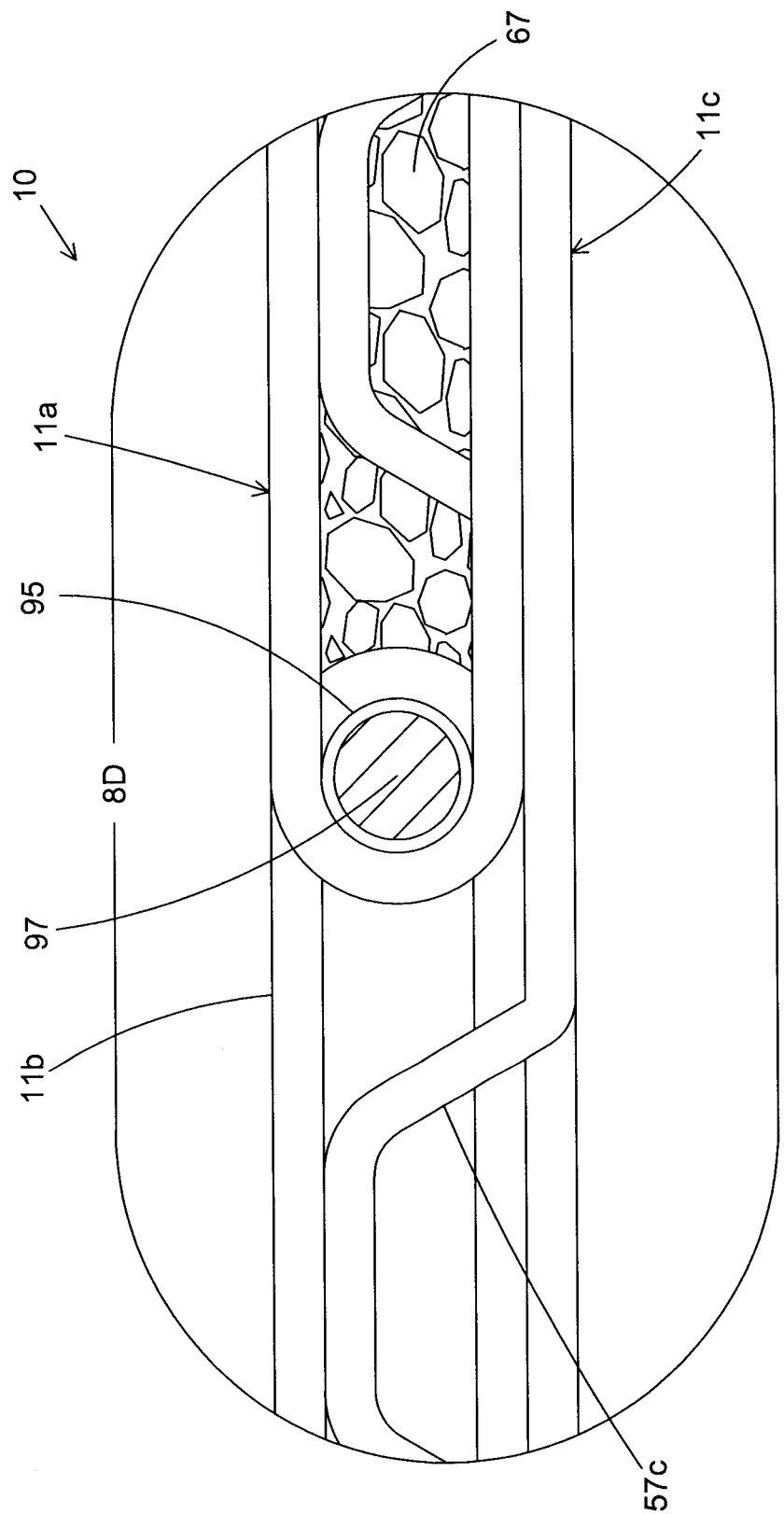
FIG. 8D is an enlarged view of the circled area 8D shown in FIG. 8

FIG. 8D illustrates a cross-sectional view of a hem region (65) including hem channel (95) with a hem connecting member (97) inserted therein. Examples of a hem connecting member (97) include a pin, a pintle, a monofilament or any other suitable material. Furthermore, a foam (67) such as an open cell porous foam or a closed cell foam can be inserted into the open spaces between end and central body regions (11a) and (11c). This can also occur in open spaces between end and central body regions (11b) and (11c). Foam (67) may provide additional compression resistance and enhance the strength of attachment between the folded panel (10) layers. The porous nature of the open cell foam allows for the passage of fluids and/or air through the textile assembly; however, both an open or closed cell foam will further ensure both a strong bond between the opposing panel layers, and resistance to compressive forces that may be applied to the textile when in use.

FIG. 8E illustrates a portion of one edge region (85a) of panel (10) following interconnection at hem region (65). Edge region (85a) is secured at (74a) to land channel (56c) in central body region (11c). Securement may be formed by TTLW or other suitable means. FIG. 8E also shows insertion of foam (67) (as described above) into the interior region between body regions (11a, 11e) proximate hem region (65). The foam (67) may be optionally injected into either the regions above land channel (56c), the apertures (55), into the exposed cavities of the folded panel (10), or any combination thereof prior to construction of the textile.

FIG. 8F illustrates the optional insertion of a foam (67) (as described above) injected into either the volume between land channels (not shown), apertures (55) remote from the hem region (shown in FIG. 8E), or into the exposed lower surfaces of central body region (11c), or any combination thereof, prior to construction of the textile. The interconnection of the panel layers may be optionally reinforced by securing top surfaces (51) of protrusions (57) to opposing planar area (53) as shown at (71a, 71c) in the manner previously described.

Figure 9:
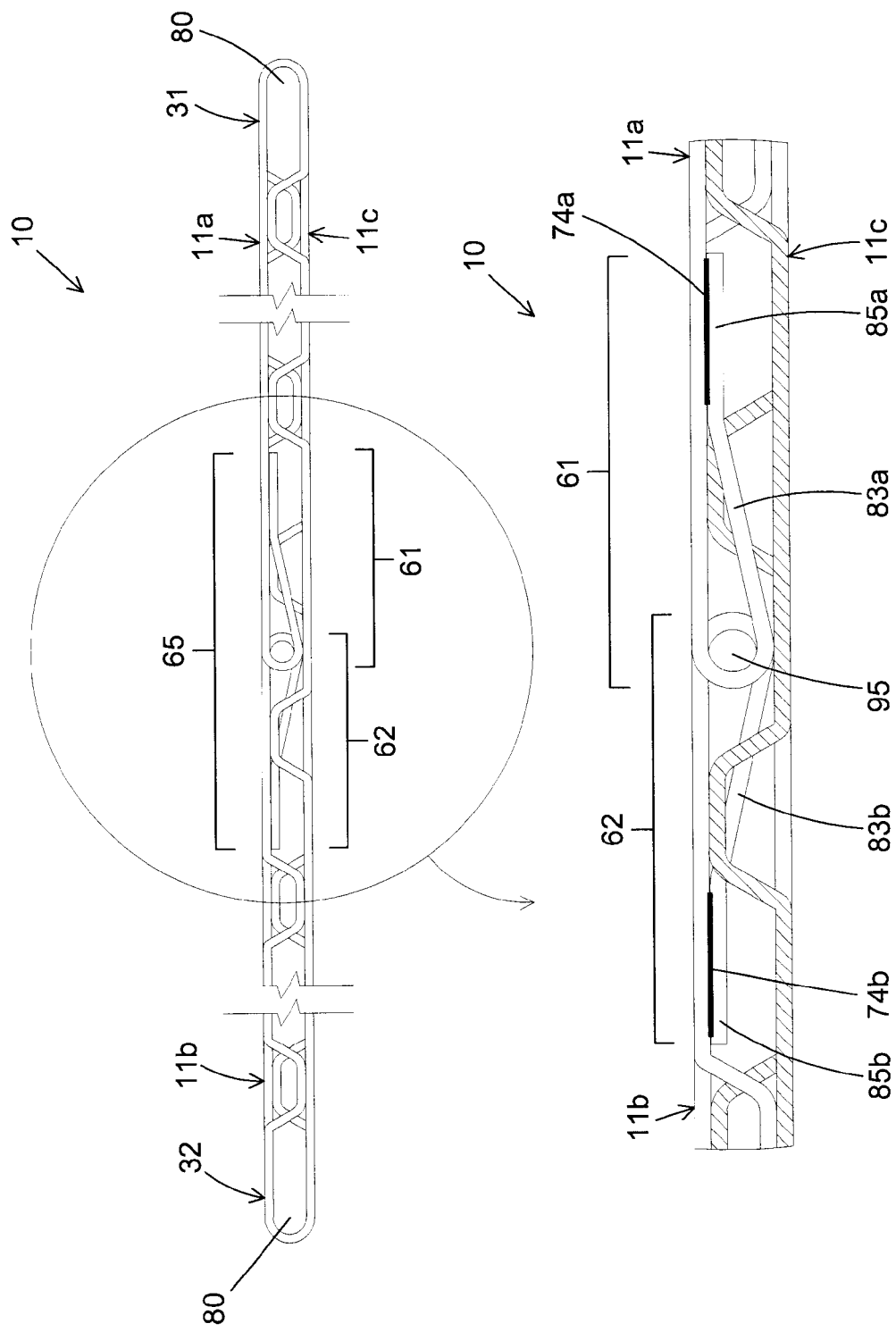
FIG. 9 illustrates a side sectional view of an alternate configuration of the fold regions in a folded panel.

FIG. 9 illustrates an alternate arrangement of securing edge regions (85a, 85b) of the folded panel (10) arranged in the manner previously discussed. In this alternate, instead of being secured to the central body region (11c), edge regions (85a, 85b) are secured at regions (74a) and (74b) to the inner surfaces of fold regions (61, 62), respectively. That is, each end fold region (61, 62) is no longer folded in a "U" shape (as in FIGS. 2 to 8), but rather, is arranged as a "rope hem" configuration. A portion (83a, 83b) of each end fold region (61, 62) is brought around hem channel (95) and is directed towards the inner surface of the fold regions (61, 62). Each edge region (85a, 85b) is in contact with the inner surface of the fold region (61, 62) where it is secured at (74a, 74b) in a manner described above. The embodiment presented in FIG. 9 provides an alternate arrangement of the hem region in the construction and assembly of the textile. When a rope hem is used, securement of the end body regions (11a, 11b) with central body region (11c) can be achieved via one or more of the methods illustrated in FIGS. 8A, 8B, 8D, and 8F.

Textile

Figure 10:
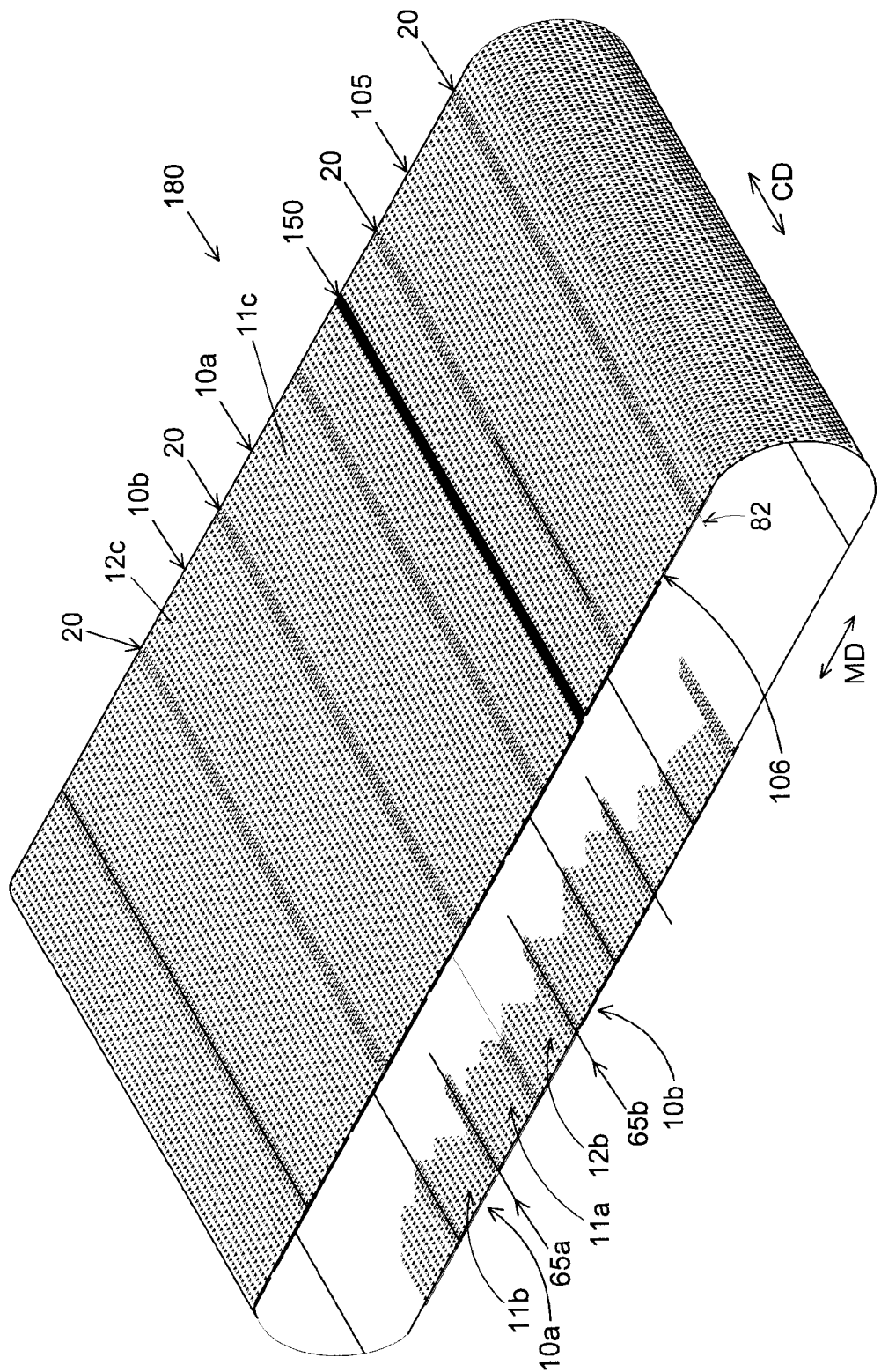
FIG. 10 is a perspective view of an embodiment of a double-layer non-woven industrial textile constructed from a plurality of folded panels.

FIG. 10 is a perspective view of an embodiment of a double layer non-woven industrial textile (180) constructed from a plurality of folded panels such as (10a) and (10b) which are constructed and arranged as described above. A non-woven seaming element (150) can be used to join opposite ends of the assembled textile (180) to form a continuous belt that can be released by removal of seaming element (150).

Folded panels (e.g. 10a, 10b) are secured in series to form the textile (180) by interconnecting each of the multiple panels at their respective seam regions (for example at (31, 32, 33, 34) in FIG. 6A), as described above. Folded panels (e.g., 10a, 10b) are interconnected at composite seam regions (20), which can be secured by use of a seam connecting member (82), as described above. In this embodiment of the textile (180), hem regions (e.g. 65a, 65b)) are on the inner surface of the textile (180). The textile (180) is also defined by lateral edges (105, 106), which are common to all of the interconnected folded panels (e.g. (10a, 10b)).

The folded panels (e.g., (10a, 10b)) can be secured from within by any of the methods described in relation to FIGS. 8-8F and 9. Furthermore, the upper surfaces of the central body regions of the folded panels (e.g. (10a, 10b)) can be provided with surface roughness, as shown, for example, in FIG. 7.

As many folded panels such as (10a, 10b) are interconnected in the manner previously described as required to provide a given length of finished textile (180). Each folded panel is oriented so that its hem (e.g. 65a, 65b) and composite seam regions (e.g. 20) are transverse to the intended run direction, or MD, of the textile (180). The textile (180) is then cut in the CD within a central body region of the folded panels (e.g. 10a, 10b) to provide a desired finished width suitable for its intended use, and a seaming element (150) (for example, as described in one of US 2012/0040150, US 2014/0199510, US 2014/0053376, WO 2014075170 or CA 2824609) may then be installed to join the opposed ends of the textile (180). The finished industrial textile (180) is thus a wholly non-woven double layer assembly that includes a seaming element (150) that allows for installation and removal of the textile (180).

Figure 11:
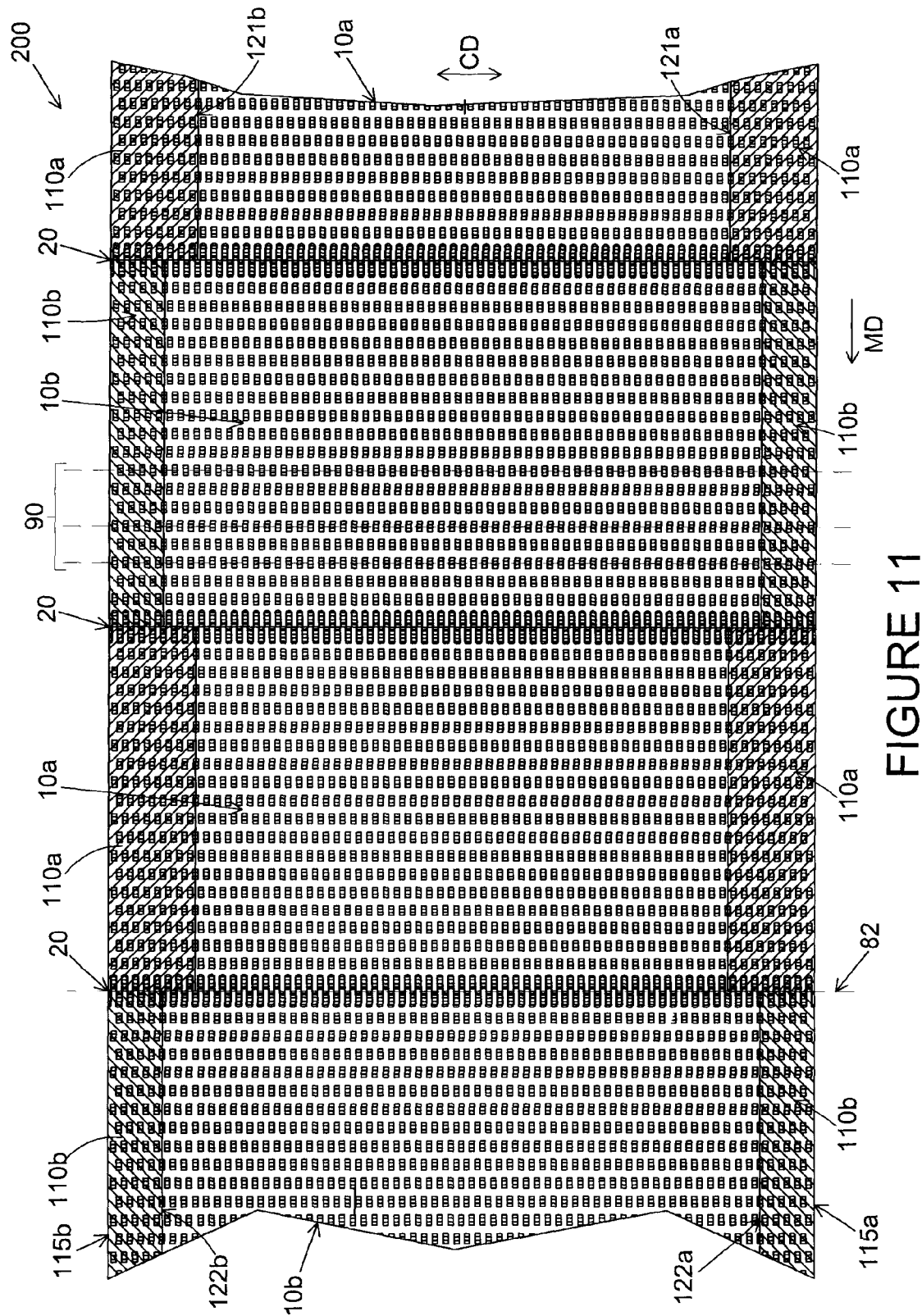
FIG. 11 is a top planar view of another embodiment of a non-woven industrial textile.

FIG. 11 is a plan view of a surface of a second embodiment of a non-woven double-layer industrial textile (200) which may be used as the product side (PS). In this view, the hem regions are hidden below the PS surface. All of the folded panels (e.g. 10a, 10b, 110a, 110b) are constructed as described above, and interconnected at composite seam regions (20) across the MD as described above. In this embodiment of the textile (200), folded panels (e.g. 10a, 10b) are secured in the CD at their first (121a, 121b) and second (122a, 122b) lateral edges to folded panels (110a, 110b). Securement across the lateral edges can be achieved, for example, by insertion of filamentary member (90) through aligned apertures (55) in the manner shown in FIG. 8A. In such an embodiment, folded panels (10a, 10b) are referred to as "interior panels" while folded panels (110a, 110b) are referred to as "exterior panels".

In FIG. 11, adjacent interior panels (10a, 10b) are offset, so that their lateral edges (121a, 121b) and (122a, 122b) are discontinuous. This results in composite seam regions (20) that include a combination of interconnections between folded panels (10a) with (10b); (10b) with 110 (a), (110a) with (110b), and so on.

Each exterior panel (110a, 110b) is structured and arranged to be identical with interior panels (10a, 10b). However, each of the exterior panels (110a, 110b) is made from a material different than that used in the composition of interior panels (10a, 10b). For example, if the textile (200) is intended for use in the dryer section of a papermaking machine, folded panels (10a, 10b) may be formed from a film comprised of polyethylene terephthalate (PET). However, in high temperature environments, the lateral edges of the textile (200) may be exposed to excess wear, heat and humidity, in which case, the PET may degrade (hydrolyze) more quickly than would be desirable. By using exterior panels (110a, 110b) that are made from heat- and hydrolysis-resistant materials, in the lateral regions of the textile (200) as shown in FIG. 11, it would be possible to prolong the service life of these exterior edges that are exposed to direct heat in the dryer section. Examples of heat-resistant and hydrolysis-resistant materials include polyphenylene sulfide (PPS) or polyaryletherketones such as PEEK.

Figure 12:
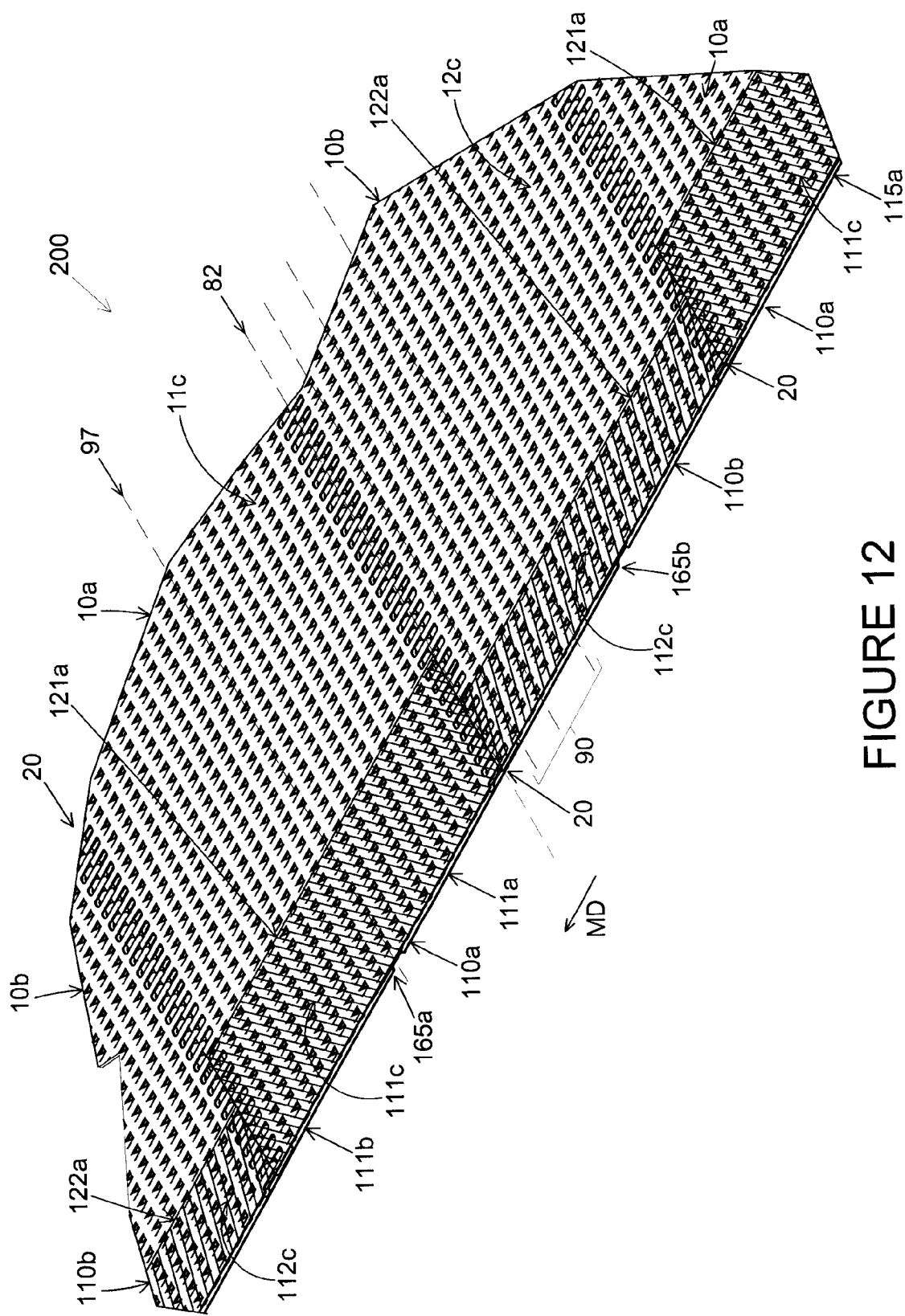
FIG. 12 is a partial perspective view of the non-woven industrial textile shown in FIG. 10.

FIG. 12 is a partial perspective view of the non-woven industrial textile shown in FIG. 11. Depressions visible in the outer surfaces of folded panels (10a, 10b) are formed by protrusions in the folded panels, as described previously.

With reference to FIGS. 11 and 12, exterior panels (110a, 110b) may be attached in the following manner. Interior panels (10a, 10b) are interconnected in textile (200) such that lateral edges (121a, 121b) and (122a, 122b) are offset so that their lateral edges are staggered as shown in FIG. 11. Adjacent internal panels (10a, 10b) are secured to each other at composite seam regions (20), as previously described. A lateral edge of external panel (110a) is then aligned with lateral edge (121a) of one of the internal panels (10a). Since all of the folded panels are identical in structure, exterior panel (110a) is then interconnected to adjacent interior panels (10b) at seam regions (20) on either side of (110a). A seam connecting member (82) can be inserted in the seam channel (80) (e.g. as in FIG. 7) formed in the composite seam regions (20) on either side of folded panels (10a) and (110a). This process is repeated for each exterior panel (110a, 110b) attached to the lateral edges (121a, 121b) of interior panels (10a, 10b) as well as at their opposite lateral edges (122a, 122b), if desired. In addition, a hem connecting member (97) can be inserted through the hem channel (95) at hem regions (e.g. 65a, 65b, 165a, 165b) of exterior panels (110a, 110b) and corresponding interior panels (10a, 10b) so as to further reinforce the folded panel interconnection in both the MD and CD.

The connection between exterior panels (110a, 110b) and corresponding interior panels (10a, 10b) in the CD can be further reinforced by inserting a filamentary element (90) through the aligned apertures of the folded panels in the manner described in relation to FIG. 8A, so as to span at least a portion of the CD panel width.

Once folded, the outer lateral edges (115a, 115b) of exterior panels (110a, 110b) are then trimmed to remove any nonlinear variations. The edges (115a, 115b) can be sealed by heat, chemical or other suitable means to prevent migration of the filamentary member (90) from the aligned apertures.

Panel Material

Panels used in the construction of a double-layer nonwoven industrial textile can include a thermoplastic polymer material, such as (but not exclusively) polyesters, polyolefins and polyamides. Alternatively, the panel can include a thermoset polymer, such as (but not exclusively) polyimides. Or, a formable metal may also be used in the construction of a panel. Where the panel is comprised of thermoplastics, laser welding can be used to secure panel surfaces and components to each other. Other bonding methods, such as chemical adhesives and mechanical attachments, can also be used.

The panels can be formed from a film that comprises a medium to high intrinsic viscosity (IV) polyester selected from the group consisting of polyethylene terephthalate (PET), polybutylene terephthalate (PBT), polyethylene naphthalate (PEN), and poly(cyclohexylene dimethylene terephthalate) acid (PCTA). It should be noted that other medium to high IV polyesters can be used. Polyamides including polyamide-6 (PA-6), PA-6/6, PA-6/10, PA-6/12 and other such materials can also be used. Polyolefins including polyethylene (PE) and polypropylene (PP) can also be used.

In instances where heat-resistant or wear-resistant material is required, the panels can be made of polyphenylene sulphide (PPS), polyaryl ether ketones (PAEK) such as polyether ether ketones (PEEK), poly(cyclohexylene dimethylene terephthalate) acid (PCTA) or a hydrolysis-stabilized thermoplastic material.

A film of polyester, in particular polyethylene terephthalate (PET), and having an IV that is between about 0.5 and 1.0 can be used. The film may be coextruded in two or more layers, or otherwise may consist of multiple layers. At least one layer of the PET film may also be biaxially oriented and hydrolytically stabilized to prevent premature depolymerization due to hydrolytic degradation when the film structure is intended for use in hot and moist environments. In such applications, carbodiimides can be used. Examples of such films are disclosed in WO 2013/177670 (incorporated herein by reference) in which the film is oriented in both the longitudinal and transverse directions to maximize its elastic modulus and other physical properties, such as tensile strength and free shrinkage.

As an example, the film, or at least one layer of a multilayer film, comprises a hydrolytic stabilizer comprising a carbodiimide. In such an example, for each layer comprising a hydrolytic stabilizer, the carbodiimide comprises between 0.5 parts by weight (w/w) and 5% w/w of the material of that layer. The carbodiimide can be selected from a monomeric form and a polymeric form. In particular the carbodiimide can be polymeric.

The polymer film material used in the panel structures can also include a laser-weld enabling material; at least one film layer can comprise a radiant energy absorbent material such as carbon black. Such a polymeric film material is disclosed in WO 2013/071419.

The film material can comprise at least two coextruded miscible layers in which at least one outer layer includes a radiant energy absorbent material and is about from 5% to 20% of the overall film thickness or caliper, which may be from about 100 μm up to 500 μm. The overall film thickness can also be in the range of about 250 μm to 350 μm. Furthermore, there can be and three coextruded miscible layers in such a film.

When the film material comprises two layers, a first layer can include a radiant energy absorbent material and can comprise from 5% to 15% of the overall film thickness, while the second layer can comprise from 85% to 95% of the overall film thickness. In addition, the first layer can comprises about 10% of the film thickness and the second layer can comprise about 90% of the film thickness.

Where the film comprises three layers, each outer layer can comprise from 5% to 20% of the overall film thickness and an inner layer can comprise from 60% to 90% of the total film thickness. In addition, each outer layer can comprise from 10% to 15% of the film thickness and the inner layer can comprise from 70% to 80% of the film thickness. At least one of the two outer layers can comprise a radiant energy absorbent material. In these examples, for each layer comprising a radiant energy absorbing material, the absorbent can be carbon black which is incorporated so as to comprise from about 0.1% w/w to about 1% w/w of the polymer material in the film layer.

Other radiant energy absorbing materials, such as clear or dyeable products e.g. Clearweld® (available from Gentex Corporation of Carbondale, Pa.) or Lumogen® (available from Basf Corporation) may also be used. The amounts of the additive used, will depend on the additive selected, but where the additive is carbon black, it can be present in amounts ranging from about 0.1% w/w to about 1.0% w/w based on the total weight of the at least one outer film layer. The amount of laser energy absorbent material additive incorporated into the film layer depends on the final thickness of the layer, taking into account the wavelength of the laser intended to be used in the welding process.

Optionally, at least one layer of the multilayer film can further comprise an additive, such as at least one of titanium dioxide, or at least one dye.

For some uses, the panel may be constructed of a thermoset polymer material such as a commercially available linear or aromatic heterocyclic polyimides which are sold in the marketplace under the tradenames Apical™, Kapton™, UPILEX™, VTEC PI™, Norton TH™ and Kaptrex™; others may be suitable. Thermosets are not amenable to laser welding and can be bonded using one of an epoxy, a solvent or chemical adhesive such as a hot melt adhesive.

A formable metal material may also be employed and, in particular, a formable metal material selected from at least one of aluminum alloy, brass, cold rolled steel, copper, galvanized steel, high strength low alloy steel, hot rolled steel, steel alloys, stainless steel and zinc. As used herein, the phrase "formable metal material" refers to a metal that that can undergo strain beyond the elastic limit of the material without causing excessive strain localization or fracture. Panels formed from these metals are amenable to both laser and resistance welding and can be bonded by these or similar means.

Alternatively, or in addition, mechanical means such as by insertion of filamentary materials through the aligned apertures of the folded panels may be employed to interconnect the panel layers.

CONCLUSION

Although the panel and textile (constructed from these panels) have been described through the use of exemplary embodiments, it will be appreciated by those of skill in the art that various modifications may be made to the described embodiments that fall within the scope and spirit of the invention as defined by the claims and their equivalents appended hereto. Moreover, in interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

PARTS LIST

| Number | Item |
|---|---|
| 1 | panel |
| 5 | body region |
| 10 | folded panel |
| 10a, 10b | folded panel |
| 11a, 11b | end body regions |
| 12a, 12b | end body regions |
| 11c | central body region |
| 12c | central body region |
| 20 | composite seam region |
| 21a, 21b | seam loop strips |
| 21a, 21b | seam loops |
| 25a, 25b | hem loop strips |
| 25a, 25b | hem loops |
| 26a, 26b | outer edges |
| 27a, 27b | hem fold lines |
| 28a, 28b | inner edge |
| 31, 32 | seam regions |
| 35a, 35b | seam fold line |
| 41a, 41b | seam slots |
| 41a, 41b | seam loop-receiving openings |
| 45a, 45b | hem slots |
| 45a, 45b | hem loop-receiving openings |
| 48 | striations |
| 51 | surface |
| 51b | surface of 57b |
| 52 | side surface |
| 53 | land area |
| 53b, 53c | land area in 11b, 11c |
| 55 | aperture |
| 56 | land channel |
| 56c | land channel in 11c |
| 57 | protrusion |
| 57b | protrusion in 11b |
| 58a, 58b | protrusions proximate 28a, 28b |
| 61, 62 | fold regions |
| 65 | hem region |
| 65a, 65b | hem regions |
| 71a, 71b, 71c | protrusion bonding locations |
| 73b, 73c | contact points |
| 74a | bonding of edge region to land channel |
| 75 | spacer member |
| 80 | seam channel |
| 82 | seam connecting member |
| 85a, 85b | edge regions |
| 90 | filamentary member |
| 95 | hem channel |
| 97 | hem connecting member |
| 100 | industrial textile |
| 110a, 110b | assembled panels fo 200 |
| 115a, 115b | outer lateral edges of 110a, 110b |
| 121a, 121b | first lateral edge of 10a, 10b |
| 122a, 122b | second lateral edge of 10a, 10b |
| 150 | seaming element |
| 105, 106 | later edges of 180 |
| 180 | industrial textile |
| 200 | industrial textile |

The invention claimed is:

1. A panel for use in construction of a non-woven industrial textile, the panel comprising: a) an inner surface and an outer surface;
   b) two opposing lateral edges and two opposing outer edges;
   c) first and second fold regions at each end of the panel, each fold region comprising:
      i) an outer edge of the panel;
      ii) an edge region;
      iii) a column of hem loop strips and hem slots, the column oriented parallel to the outer edge and set adjacent the edge region; and
      iv) a hem fold line substantially midway through the column of hem loop strips and hem slots, the hem fold line oriented parallel to the outer edge;
   d) a body region in between the first and second fold regions, the body region comprising:
      i) a plurality of protrusions and land areas on the inner surface of the panel, with a land area in between each protrusion;
      ii) first and second seam regions, each seam region comprising: a column of seam slots and seam loop strips, the column oriented parallel to the outer edge; and a seam fold line substantially midway through the column of seam loop strips and seam slots, oriented parallel to the outer edge;
      iii) first and second end body regions, the first end body region between the first fold region and the first seam fold line; the second end body region between the second fold region and the second seam fold line; and
      iv) a central body region in between the first and second seam fold lines;
   wherein the panel forms a folded panel when the panel is:
   first folded along each hem fold line such that each outer edge is oriented towards the inner surface of the panel, each hem loop strip forms a hem loop, and each hem slot forms a hem loop-receiving opening for receipt of a hem loop of the opposite fold region;
   then subsequently folded along each seam fold line such that the inner surface of the panel at each end body region is oriented opposite the inner surface of the panel at the central body region; the first and second fold regions are interconnected at a hem region and nestled between the central body region and the respective end body regions; each seam loop strip forms a seam loop; each seam slot forms a seam loop-receiving opening for receipt of a seam loop of an adjacent folded panel; the combined end body regions form a first layer of the folded panel, the central body region forms a second layer of the folded panel; and the first layer is secured to the second layer by securing protrusions in the first layer to opposite land areas in the second layer and/or securing protrusions in the second layer to opposite land areas in the first layer.

2. The panel according to claim 1, wherein the plurality of protrusions are arranged in a series of columns parallel to each column of seam loop strips and seam slots.

3. The panel according to claim 1, wherein each protrusion includes at least one lateral aperture.

4. The panel according to claim 3, wherein the at least one lateral aperture provides a flow path for fluid and/or air to pass between the outer surface and the inner surface of the panel.

5. The panel according to claim 1, wherein each hem slot is dimensioned to receive at least one of the protrusions.

6. The panel according to claim 1, wherein in the folded panel, each fold region is folded into a U-shape, and the fold regions are secured together by at least one of:
 a) a hem connecting member placed in a hem channel formed by the interconnected fold regions; and
 b) each edge region is secured to the inner surface of the opposite end body region.

7. The panel according to claim 1, comprising a thermoplastic material, a thermoset material or a formable metal.

8. A double-layer non-woven industrial textile constructed from a plurality of folded panels secured adjacently in series, wherein:
 a) each folded panel comprises the panel of claim 1 such that each folded panel is folded to form a folded panel;
 b) adjacent folded panels are interconnected at a composite seam region, the composite seam region formed by insertion of the seam loops of a first folded panel into the seam loop-receiving openings of a second folded panel and the seam loops of the second folded panel into the seam loop-receiving openings of the first folded panel, thereby forming a seam channel at the composite seam region; and
 c) the adjacent folded panels are secured to each other by insertion of a seam connecting member in the seam channel between the adjacent folded panels.

9. The double-layer non-woven industrial textile according to claim 8, wherein within each folded panel, the plurality of protrusions is arranged in a series of columns parallel to each column of seam loop strips and seam slots.

10. The double-layer non-woven industrial textile according to claim 8, wherein each protrusion includes at least one lateral aperture.

11. The double-layer non-woven industrial textile according to claim 10, wherein the central body region and the end body regions of at least one folded panel are further secured together by at least one filamentary member that passes through aligned apertures of a column of protrusions in the first layer staggered with a column of protrusions in the second layer.

12. The double-layer non-woven industrial textile according to claim 8, wherein in each folded panel, each fold region is folded into a U-shape, and the fold regions are secured together by at least one of:
 a) a hem connecting member placed in a hem channel formed by the interconnected fold regions; and
 b) each edge region is secured to the inner surface of the opposite end body region.

13. The double-layer non-woven industrial textile according to claim 8, wherein each folded panel comprises a thermoplastic material, a thermoset material or a formable metal.

14. The double-layer non-woven industrial textile according to claim 8, wherein additional exterior folded panels are secured to at least one of the first and second lateral edges of each folded panel, such that the material of the additional exterior folded panels is different from the material of each folded panel.

15. A panel for use in construction of a non-woven industrial textile, the panel comprising:
 a) at least one layer of polymer film of oriented PET which includes a radiant-energy absorbing material;
 b) an inner surface and an outer surface;
 c) two opposing lateral edges and two opposing outer edges;
 d) first and second fold regions at each end of the panel, each fold region comprising:
  i) an outer edge of the panel;
  ii) an edge region;
  iii) a column of hem loop strips and hem slots, the column oriented parallel to the outer edge and set adjacent the edge region; and
  iv) a hem fold line substantially midway through the column of hem loop strips and hem slots, the hem fold line oriented parallel to the outer edge;
 e) a body region in between the first and second fold regions, the body region comprising:
  i) a plurality of protrusions and land areas on the inner surface of the panel, with each protrusion having at least one aperture, and a land area in between each protrusion;
  ii) first and second seam regions, each seam region comprising: a column of seam slots and seam loop strips, the column oriented parallel to the outer edge; and a seam fold line substantially midway through the column of seam loop strips and seam slots, oriented parallel to the outer edge;
  iii) first and second end body regions, the first end body region between the first fold region and the first seam fold line; the second end body region between the second fold region and the second seam fold line; and
  iv) a central body region in between the first and second seam fold lines;
wherein the panel forms a folded panel when the panel is:
first folded along each hem fold line such that each outer edge is oriented towards the inner surface of the panel, each hem loop strip forms a hem loop, and each hem slot forms a hem loop-receiving opening for receipt of a hem loop of the opposite fold region;
then subsequently folded along each seam fold line such that the inner surface of the panel at each end body region is oriented opposite the inner surface of the panel at the central body region; the first and second fold regions are interconnected at a hem region and nestled between the central body region and the respective end body regions; each seam loop strip forms a seam loop; each seam slot forms a seam loop-receiving opening for receipt of a seam loop of an adjacent folded panel; the central body region forms a first layer of the folded panel, the combined end body regions form a second layer of the folded panel; and the first layer is secured to the second layer by securing protrusions in the first layer to opposite land areas in the second layer and/or securing protrusions in the second layer to opposite land areas in the first layer.

16. The panel according to claim 15, wherein the polymer film is biaxially oriented.

17. The panel according to claim 15, wherein the panel comprises at least two co-extruded layers of polymer film, and one of the at least two co-extruded layers includes a radiant energy absorbing material.

18. The panel according to claim 17, wherein the radiant energy absorbing material is carbon black.

\* \* \* \* \*